(12) United States Patent
Kugumiya

(10) Patent No.: US 7,428,246 B2
(45) Date of Patent: Sep. 23, 2008

(54) APPARATUS AND METHOD OF PACKETIZING DATA STREAM

(75) Inventor: Mamoru Kugumiya, Chiba (JP)

(73) Assignee: Sony Corporation, Tokyo (JP)

( * ) Notice: Subject to any disclaimer, the term of this patent is extended or adjusted under 35 U.S.C. 154(b) by 1682 days.

(21) Appl. No.: 10/085,647

(22) Filed: Feb. 26, 2002

(65) Prior Publication Data

US 2003/0193940 A1   Oct. 16, 2003

(30) Foreign Application Priority Data

Feb. 27, 2001   (JP)   ............................. 2001-052611

(51) Int. Cl.
*H04J 3/24* (2006.01)
(52) U.S. Cl. ................. 370/474; 375/240.1; 375/240.25
(58) Field of Classification Search ........................ None
See application file for complete search history.

(56) References Cited

U.S. PATENT DOCUMENTS

| 5,801,781 | A | 9/1998 | Hiroshima et al. | |
| 6,172,988 | B1 | 1/2001 | Tiernan et al. | |
| 6,188,703 | B1 * | 2/2001 | Dobson et al. | 370/537 |
| 6,404,814 | B1 * | 6/2002 | Apostolopoulos et al. | 375/240.12 |
| 6,480,537 | B1 * | 11/2002 | Agrawal et al. | 375/240 |
| 6,529,550 | B2 * | 3/2003 | Tahara et al. | 375/240 |
| 6,570,926 | B1 * | 5/2003 | Agrawal et al. | 375/240.27 |
| 6,795,506 | B1 * | 9/2004 | Zhang et al. | 375/240.26 |
| 6,973,258 | B1 * | 12/2005 | Yoo et al. | 386/111 |
| 6,983,019 | B2 * | 1/2006 | Yiwen et al. | 375/240.16 |
| 7,039,116 | B1 * | 5/2006 | Zhang et al. | 375/240.26 |
| 7,088,775 | B2 * | 8/2006 | Sato et al. | 375/240.17 |
| 2001/0010706 | A1 * | 8/2001 | Sato et al. | 375/240.12 |
| 2002/0001348 | A1 * | 1/2002 | Yiwen et al. | 375/240.26 |

FOREIGN PATENT DOCUMENTS

| EP | 0 893 926 | 1/1999 |
| EP | 0 914 008 | 5/1999 |

OTHER PUBLICATIONS

Draft: "Generic Coding of Moving Pictures and Associated Audio Systems" Nov. 13, 1994, ISO/IEC, International Organisation for Standardisation XP002200170 section: Introduction section: 1-2.4.

* cited by examiner

*Primary Examiner*—Bob A Phunkulh
(74) *Attorney, Agent, or Firm*—Frommer Lawrence & Haug LLP; William S. Frommer; Thomas F. Presson

(57) ABSTRACT

An apparatus and a method for packetizing a coded bitstream of digital data in accordance with a transport protocol. Packetizer receives MPEG4 stream from an encoder and translates it into MPEG2-PEG packet. A multiplexer receives the stream of the MPEG2-PEG packet form and transports a stream of MPEG2-TS form as a transport output signal. The packetizer detects a header from the MPEG4 stream and analyzes the header to obtain predetermined information from Video_Object_Layer header and Video_Object_Plane header. The packetizer generates the time information such as ESCR, DTS, and PTS using the predetermined information and an initial value of ESCR supplied from outside. The PES header including such time information is generated. The packetizer further generates the MPEG2-PES packet in sequence with the generated PES header added into every AU of the MPEG4 stream and obtains the stream of MPEG2-PEG packet form.

37 Claims, 13 Drawing Sheets

APPARATUS AND METHOD OF PACKETIZING DATA STREAM

BACKGROUND OF THE INVENTION

1. Field of the Invention

The present invention relates generally to an apparatus and a method for packetizing a coded bitstream of digital data in accordance with a transport protocol. More particularly, it relates to an apparatus and a method for packetizing the bitstreams wherein time information is generated in accordance with a specification of the protocol, a header including the time information is generated, and a packet including the time information in accordance with the protocol is generated with adding the header to every predetermined unit of the bitstreams.

2. Description of Related Art

Many researches for digital broadcasting utilizing an MPEG4 stream defined by the Moving Picture Experts Group, a working group of ISO, as ISO/IEC 14496 are going on to find an alternative to an MPEG2-stream (ISO/IEC 13818), which has been conventionally used for the digital broadcasting.

Syntax of a stream of MPEG4 Visual Object Sequence defined as ISO/IEC 14496-2 is shown in FIGS. 1 and 2. At the top of the hierarchy as shown in FIG. 1 is the Visual Object Sequence. The Visual Object Sequence includes mostly Profile and Level indications of the stream. Each Visual Object included in the Visual Object Sequence describes a type of objects that are multiplexed on the stream. Thus, this allows the MPEG4 to define a plurality of visual objects such as still-frame video image objects, face objects, and video objects.

The case that the video objects are multiplexed on the stream will be described. Information, "visual_object_type (4): 0x01" described in the Visual Object indicates that the type of Visual Object is video object. If the type of Visual Object is video object and the Video Objects are multiplexed, the Visual Object includes Video Object Layer. The Video Object Layer includes a type of Video Object, a bit rate of the stream, a size of a buffer of the receiver side, occupancy of data to be stored in the buffer of the receiver side up to a start of the decoding, and a frame rate.

Herein, the information of 30 bits, "first_half_bit_rate (15)" and "latter_half_vbv_bit_rate (15)", described in the Video Object Layer indicates the bit rate of the stream. The information of 18 bits, "first_half_vbv_buffer_size (15)"0 and "latter_half_vbv_buffer_size (3)", described in the Video Object Layer indicates a size of the buffer of receiver side. The information of 22 bits, "first_half_vbv_occupancy (11)" and "latter_half_vbv_occupancy (11)", described in the Video Object Layer indicates the occupancy of the data to be stored in the receiver side up to a start of the decoding. The information, "vop_time_increment_resolution (16)" and "fixed_vop_timeincrement (1-16)", contains information to get the frame rate. Although the information from "first_half_bit_rate (15)" to "latter_$half$_vbv_occupancy (11)" as described above exists when "vbv_parameters (1)" are set to 0x1, it does not exist when they are set to 0x0 where "0x" indicates hexadecimal digit.

The Video Object Layer may Include Group of Video Object Plane. The Group may be excluded in compliance with a stream. The Group includes Time code. It also includes Video Object Plane (hereinafter called VOP). The VOP corresponds to a frame of picture in the video images. Here, it includes VOP coding type and an order of reproduction. The information, "vop_coding_type (2)" described in the VOP indicates I-picture, P-picture or B-picture. The information, "modulo_time_base" described in the VOP indicates how many seconds it takes for a picture to occur after I-picture. The information, "vop_time_increment (1~16)" described in the VOP indicates how order the picture should occur, namely, the order of reproduction thereof. The VOP includes the bitstreams each indicating internal information of VOP following the above information.

Many researches for transporting the bitstreams each having the above syntax on the Internet and/or broadcasting waves have been done.

MPEG4 stream fails to define transport stream (hereinafter called TS) and packetized elementary stream (hereinafter culled PES), which are available in the transport thereof. Thus, although a user can freely set TS End PES, he or she is required to alter their stream structure according to the transport protocol thereof.

In ISO 13818-1/FDAM7 (ISO/IEC JTC1/SC29/WG11 N3050), standardization in ease of using MPEG2-TS goes on whereas implementing method, namely, translation method that the MPEG4 stream is translated into an MPEG2 packetized elementary stream (hereinafter. called MPEG2-PES) packet has not been determined.

Alternatively, MPEG4 Visual Object Sequence (ISO/IEC 14496-2) fails to multiplex time information such as elementary stream clock reference (hereinafter called ESCR), decoding time stamp (hereinafter called DTS), presentation time stamp (hereinafter called PTS), which is necessary for the synchronization in a packet. Thus, it is necessary to transport the MPEG4 Visual Object Sequence with adding the time information in order to attain the synchronization.

Japanese Patent Publication, JP-H11-98193-A, discloses a translation of MPEG4 stream into MPEG2-PES packet. It, however, discloses no particular way of translation.

It is an object of the present invention to present an apparatus and a method capable of obtaining a packet including the time information in accordance with the transport protocol.

SUMMARY OF THE INVENTION

According to the present invention, the foregoing object is attained by an apparatus for packetizing coded bitstreams of digital data. In accordance with a transport protocol. The apparatus comprises time information generating unit for generating time information in accordance with a specification of the transport protocol, and header generating unit for generating a header that includes the time information generated by the time information generating unit. It further comprises packet generating unit for generating a packet with adding the header generated by the header generating unit into every predetermined unit of bitstream.

In accordance with one aspect of the invention, a method of packetizing a coded bitstream of digital data in accordance with a transport protocol is presented. The method comprises a time information generating step of generating time information in accordance with a specification of the transport protocol and a header generating step of generating a header that includes the time information generated during the time information generating step. The method further comprises a packet generating step of generating a packet with adding the header generated during the header generating step into every predetermined unit of bitstream.

According to the present invention, whom packetizing the coded bitstream of digital data in accordance with the transport protocol, for example, translating MPEG4 stream into MPEG2-PES packet, the time information is first generated in accordance with the specification of the transport protocol.

The header is illustratively detected from the coded bitstream of digital data. The header analyzing unit analyzes the header thus detected. This permits predetermined information to be obtained therefrom. Using such the predetermined information allows the time information In accordance with the specification of transport protocol to be generated.

Alternatively. a bit rate of the coded bitstream of digital date is illustratively detected. The time information in accordance with the specification of transport protocol is generated using such the detected bit rate. Using a predetermined bitstream other than the coded bitstream of digital data, for example, the time information contained in a stream of the MPEG2-PES packet form also allows the time information in accordance with the specification of the transport protocol to be generated.

Further, the time information in accordance with the specification of transport protocol is generated using information from an encoder for generating the coded bitstream of digital data. The time information is also generated using maximum bit rate of the coded bitstream of digital data.

The apparatus further comprises a stream analyzer for analyzing the coded bitstream of digital data, and an arithmetic unit for performing arithmetic operation on, namely, calculating time until a decoder for decoding at least the coded bitstream of digital data starts decoding the bitstream on the basis of a result of the analysis of the stream analyzer. According to the apparatus, the time information in accordance with the specifications of transport protocol is generated using an arithmetic result of the arithmetic unit.

Such the generated time information in accordance with the specifications of transport protocol is included in the header. A packet is generated with adding the header to every predetermined unit of the bitstreams. Thus, the packet contains the time information in accordance with the specification of transport protocol. Therefore, a receiver receiving the packet containing the time information can synchronously reproduce the bitstreams using the time information.

Since the packet includes the time information, receiver side carries out the decoding thereof without a failure and performs the synchronization with another stream easily.

In accordance with another aspect of the invention, an apparatus for packetizing a plurality of coded bitstreams of digital data in accordance with respective transport protocols is provided. The apparatus comprises a plurality of time information generating units each for generating the time information in accordance with specifications of each of the transport protocols. The apparatus further comprises a plurality of header generating units each for generating a header including a plurality of the pieces of time information generated by the time information generating units, and a plurality of packet generating units each for generating a packet with adding the headers generated by the header generating unit into every predetermined unit of the plurality of bitstreams. According to the apparatus, the plurality of time information generating units respectively generates time information in accordance with the specification of each of the transport protocols using common time information.

In accordance with further aspect of the invention, a method of packetizing a plurality of coded bitstreams of digital data in accordance with respective transport protocols is provided. The method comprises time information generating step of generating a plurality of pieces of the time information in accordance with the specification of each of the transport protocols. The method further comprises header generating step of generating a plurality of headers each including the plurality of pieces of the time information generated during the time information generating step. It also comprises packet generating step of generating a plurality of packets with adding the headers generated during the header generating step into every predetermined unit of a plurality of the bitstreams. During the time information generating step, a plurality of pieces of the time information in accordance with the specification of each of the transport protocols is generated using common time information.

According to this aspect of the invention, when packetizing a plurality of coded bitstreams of digital data in accordance with specification of each of the transport protocols, for example, translating a plurality of the MPEG4 streams into each of the MPEG2-PES packets, a plurality of pieces of the time information is first generated in accordance with specifications of each of the transport protocols.

In this case, a plurality of pieces of the time information in accordance with specification of each of the transport protocols is generated using common time information. Thus, the plurality of pieces of the time information is generated on same time axis.

Such the plurality of pieces of the generated time information in accordance with the specification of each of the transport protocols is inserted into each of the headers. A packet is generated with adding the headers to every predetermined unit of the plurality of the bitstreams. Thus, the packet contains the time information in accordance with the specifications of transport protocols. Therefore, a receiver receiving the packet containing such the time information can synchronously reproduce the bitstreams using the time information.

Since the packet includes the time information receiver side carries out the decoding thereof without a failure and performs the synchronization with another stream easily.

In accordance with still another aspect of the invention, the apparatus further comprises storing device for storing the coded bitstreams every predetermined unit of the coded bitstreams. According to this aspect of the invention, time information generating unit generates the time information, which is necessary for a synchronous transport in accordance with the transport protocol, every the predetermined unit. Packet generating unit generates a packet with adding the time information generated by the time information generating unit into every the predetermined unit stored in the storing device In accordance with still further aspect of the invention, the apparatus further comprises storing device of storing the MPEG4 stream every predetermined unit of the MPEG4 stream. According to this aspect of the invention, time information generating unit generates the time information, which is required to transport the bitstream in accordance with an MPEG2-PES stream protocol, every the predetermined unit of MPEG4. Packet generating unit generates a packet with adding the time information generated by the time information generating unit into every the predetermined unit of the MPEG4 stream stored in the storing device.

In accordance with another aspect of the invention, the apparatus further comprises detecting unit of detecting from the MPBG4 stream the information that is required to generate the time information required when the MPEG2-PES stream is transported. It also comprises time information generating unit for generating the time information every the predetermined unit of MPEG4 stream on the basis of the information detected by said detecting unit.

The conclusion unit of this specification particularly points out and distinctly claims the subject matte of the present invention. Those skill in the art, however, will best understand both the organization and the method of operation of the invention, together with further advantages and objects thereof, by reading the remaining portion of the specification in view of the accompanying drawing(s) wherein like reference characters refer to like elements.

BRIEF DESCRIPTION OF THE DRAWING(S)

DETAILED DESCRIPTION OF THE PREFERRED EMBODIMENT(S)

1. Transport System (1) First Embodiment of the Invention

Figure 1:
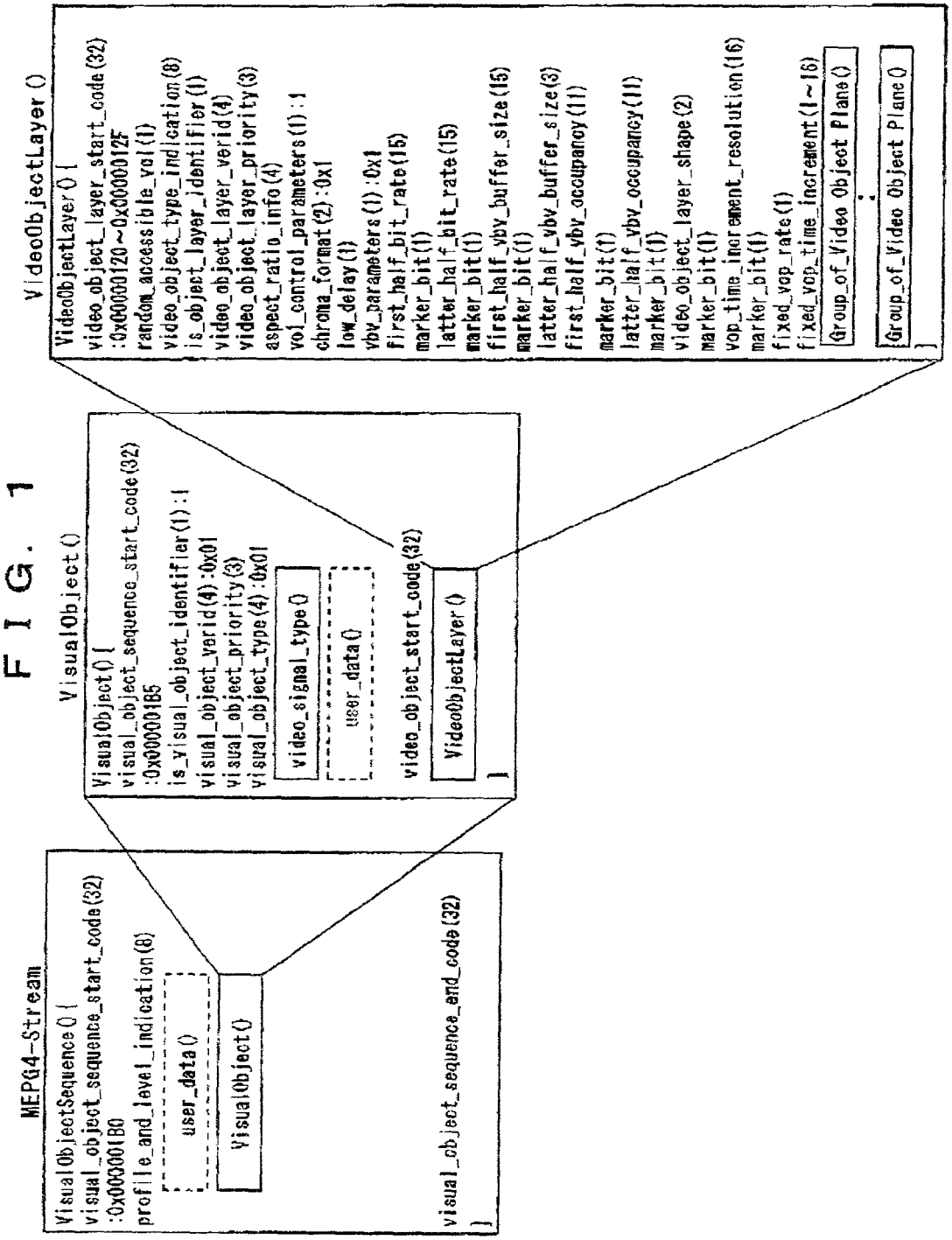
FIG. 1 is a diagram depicting a structure of MPEG4 stream (part one)
Figure 2:
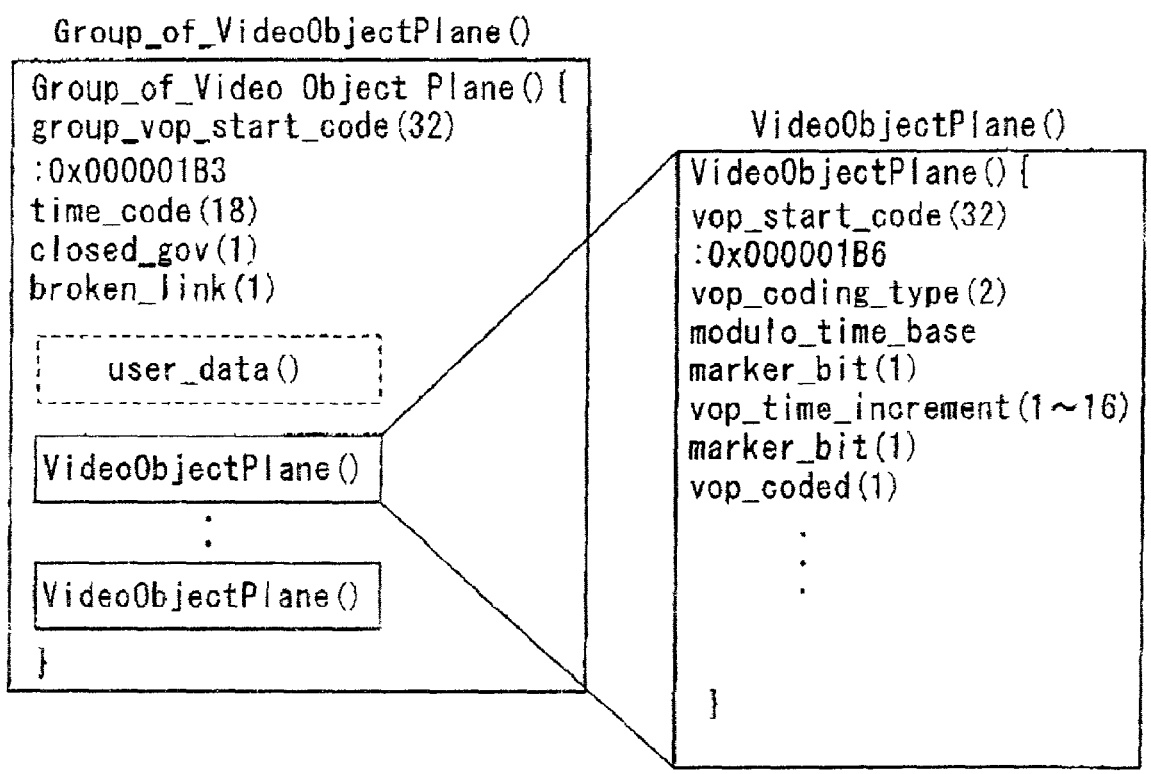
FIG. 2 is a diagram depicting a structure of MPEG4 stream (part two)
Figure 3:
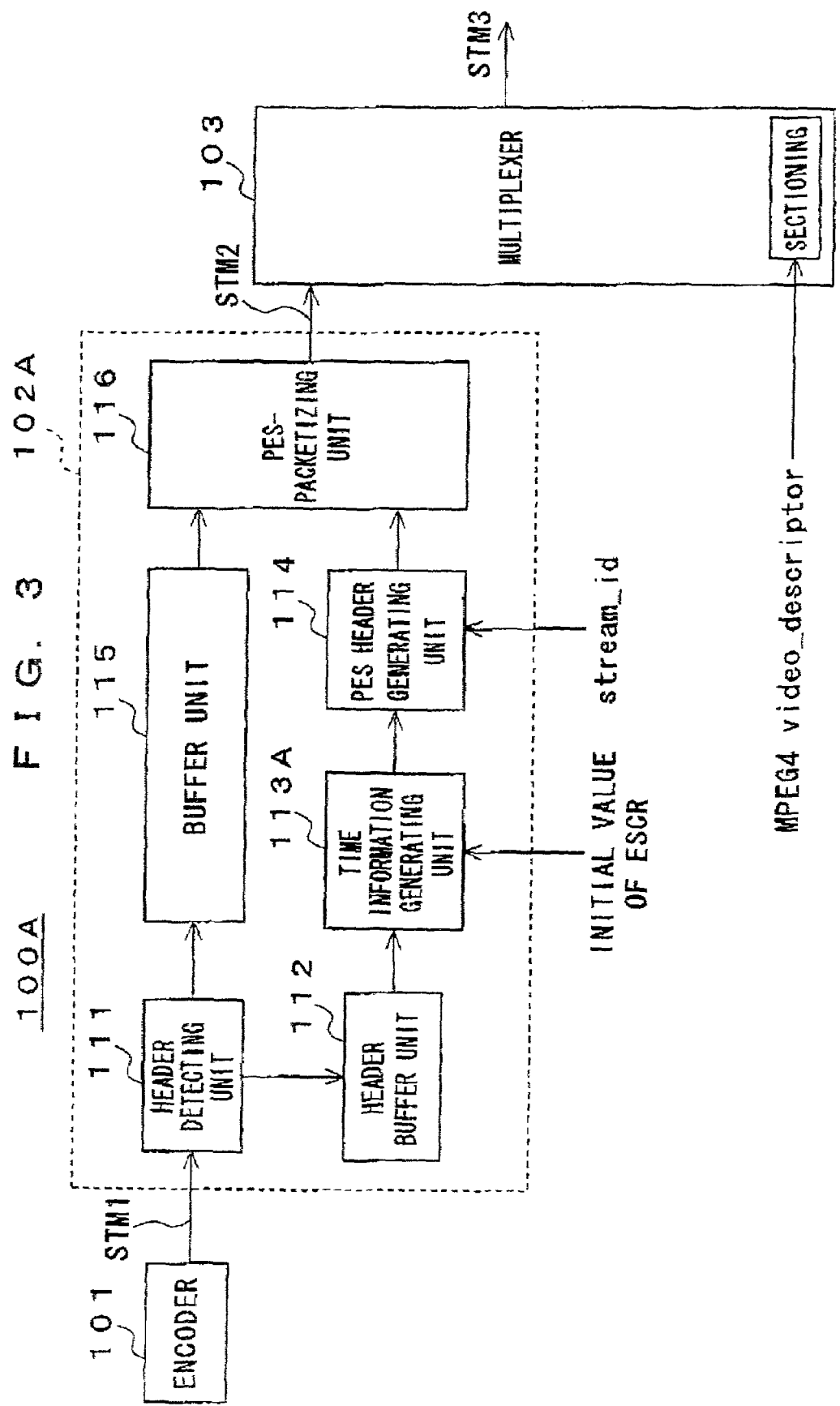
FIG. 3 is a block diagram depicting configuration of a transport system according to a first embodiment of the present invention.

FIG. 3 illustrates in a block diagram form configuration of a transport system 100A as a first embodiment of the invention. The transport system 100A comprises encoder 101 for encoding and transferring MPEG4 stream STM1 a packetizer 102A for receiving the MPEG4 stream STM1 from the encoder 101, translating it into MPEG2-PES packet and transferring a stream STM2 of MPEG2-PES packet form, and a multiplexer 103 for receiving and multiplexing the MPEG2-PES packet stream STM2 from the packetizer 102A and transporting a stream STM3 of MPEG2-TS form as a transport output signal.

According to the transport system 100A, the MPEG4 stream STM1 transferred from the encoder 101 is supplied to the packetizer 102A, which translates it into MPEG2-PES packet. The stream STM2 of MPEG2-PES packet form transferred from the packetizer 102A is supplied to the multiplexer 103, which transports the stream STM3 of MPEG2-TS form as its output signal. The multiplexer 103 sections the information, MPEG4 video_descriptor and multiplexes the stream STM2 and the information, MPEG4 video_descriptor thus sectioned to indicate that the data contained in the stream STM2,which the multiplexer 103 receives, is MPEG4 stream.

The packetizer 102A comprises a header detecting unit 111 for receiving MPEG4 stream STM1 and detecting headers from the stream STM1, a header buffer unit 112 for receiving the headers detected by the header detecting unit 111, storing them every header, and detecting information required to generate time information to be inserted into the header of MPEG2-PES packet, a time information generating unit 113A for generating the time information such as ESCR, DTS, and PTS using the information detected by the header buffer unit 112 and initial value of ESCR, which is supplied from outside.

The packetizer 102A further comprises a PES header generating unit 114 for generating a PES header using the time information such as ESCR, DTS, and PTS generated by the time information generating unit 113A and the information, stream_id supplied from outside. It also comprises a buffer unit 115 for storing received MPEG4 stream STM1 in sequence every one access unit (hereinafter called AU) and a PES-packetizing unit 116 for generating MPEG2-PES packet with adding the PES header generated by the PES header generating unit 114 into a head of the data of one AU stored in the buffer unit 115. Here, although the essential components of MPEG4 stream STM1 of one AU are VOPs, a first AU comprises a header portion of upper layer before a first VOP.

The following operation of the packetizer 102A will be explained more in detail. The header detecting unit 111 receives MPEG4 stream STM1 and detects the headers from the stream STM1.

The header detecting unit 111 counts a number of AUs assuming that one AU is detected if the with 111 detects the headers more than the VOP headers contained in the above Group of Video Object Plane when detecting the VOP headers, and keeps the counts as a variable (hereinafter called AUcnt). The header detecting unit 111 also counts a number of bytes in each AU and keeps them as a variable (hereinafter called AU[i]) on one AU basis where "i" is an integer included in the interval $1 \leq i \leq AUcnt$ and indicates detected order of the AUs. The time information generating unit 113A uses these variables (AUcnt and AU[i]) when generating the time information such as ESCR, DTS, and PTS, as will be described hereinafter. When MPEG4 data has completed, it processes final AU of the MPEG4 stream STM1 as if it might detect one AU.

The buffer unit 115 receives input MPEG4 streams STM1 and stores them in sequence on one AU basis. The header buffer unit 112 receives the detected headers from the header detecting unit 111 and stores them one by one. The header buffer unit 112 also analyzes stored headers and detects the time information as follows:

first_half_bit_rate and latter_half_bit_rate each indicating bit rate of the MPEG4 stream STM1 are detected from a header of the Video_Object_Layer; first_half_vbv_occupancy and latter_half_vbv_occupancy each indicating an occupancy of the data to be stored in the buffer unit until a receiver side starts decoding are detected from a header of the Video_Object_Layer; vop_time_increment_resolution and fixed_vop_time_increment each obtaining frame rate are detected from a header of the Video_Object_Layer; vop_coding_type indicating I-picture, P-picture or B-picture is detected from a header of the Video_Object_Plane; modulo_time_base indicating how many seconds it takes for a picture to occur after I-picture is detected from a header of the Video_Object_Plane; and vop_time_increment indicating how order a picture should occur, namely, the order of reproduction is detected from a header of the Video_Object_Plane.

The time information generating unit 113A receives the above information detected by the header buffer unit 112. The unit 113A also generates the time information such as ESCR, DTS, and PTS using the information obtained by analyzing the headers, the variables (AUcnt and AU[i]) stored in the header detecting unit 111, and initial value of ESCR, which is supplied from outside, I will explain operations for generating the time information. The unit 113A initially gets the information, DTS_Offset, indicating the time until the receiver side starts decoding after receiving the data. I may calculate the value of the information, DTS_Offset, by the data occupancy, vbv_occupancy, to be stored in the buffer unit and bit rates, bit_rate, as follows:

If vbv_occupancy=first_half_
vbv_occupancy*0x8000+latter_half_vbv_occupancy and bit_rate=first_half_bit_rate*0x8000+
latter_half_bit_rate, then DTS_Offset [sec]=(64*vbv_occupancy)/
(bit_rate*400)

where 0x8000 indicates 8000in hexadecimal.

Next, the unit 113A gets the time (T) to be updated on one AU basis I may calculate the value of the time (T) by the information, fixed_vop_time_increment and vop_time_increment_resolution, which have been already detected to calculate the frame rate, as follows:

T [sec]=fixed_vop_time_increment/vop_time_
increment_resolution.

According to these calculated values, I may get decoding time, DTS, for "i"th AU as follows:

DTS=T*i+DTS_Offset+ESCR_base where ESCR_base indicates initial value of ESCR.

The unit 113A also counts a number (m_cnt) of "1" included in the information, modulo_time_base, the number, m_cnt, indicating how many seconds it takes for a picture to occur after I-picture already detected. Namely, the information, m_cnt indicates a number of "1" included in the information, modulo_time_base.

The unit 113A gets the information indicating reproduction time (vop_time). I may calculate the value of the time (vop_time) by the information, vop_time_increment indicating an order of reproduction and the above vop_time_increment_resolution as follows:

vop_time=vop_time_increment/vop_time_
increment_resolution.

According to these calculated values, I may get reproduction time, PTS, for "i"th AU with putting the information, vop_time, m_cnt, DTS_Offset, and ESCR_base together with each other as follows:

PTS=vop_time+m_cnt+DTS_Offset+ESCR_base.

Therefore, I may also get reference time, ESCR, for "i"th AU as follows:

ESCR=1/bit_rate*8*(ΣAU [i−1]+ESCR_byte)+
ESCR_base where ESCR_byte indicates a number of bytes occurred from a top of the PES header to an ESCR field every AU and Σ AU [i−1] indicates a sum of the values from AU [1] to AU [i−1 ].

The PES header generating unit 114 receives the time information, ESCR, DTS, PTS thus generated by the unit 113A. The unit 114 generates PES header using the time information, and stream identification information, stream_id, supplied from outside. The unit 114 generates the PES header on one detected AU basis.

The unit 114 initially gets values in the interval between 0xE0 and 0xEF of the stream identification information, stream_id, from outside where "0x" indicates that succeeding figure(s) is (are) hexadecimal digit(s). If PTS is equal to DTS, then the unit 114 gets PTS and ESCR. If not equal, it gets PTS, DTS, and ESCR together with PTS_DTS_flags and ESCR_flag. It also calculates and gets PES_header_data_length according to added time information.

An embodiment of the PES headers is illustrated as follows:

| | |
|---|---|
| packet_start_code_prefix = 0x000001; | /*24 [bit]*/ |
| stream_id = 0xEX; | /*8 [bit]*/ |
| PES_packet_length = 0x0000; | /*16 [bit]*/ |
| optional_PES_header = 0x2; | /*2 [bit]*/ |
| PES_scrambling_control = 0x00; | /2 [bit]*/ |
| PES_priority = 0x0; | /1 bit]*/ |
| data_alignment_indicator = 0x1 | /1 bit]*/ |
| copyright = 0x0; | /1 bit]*/ |
| original_or_copy = 0x0; | /1 bit]*/ |
| PTS_DTS_flags = 0xXX; | /2 bit]*/ |
| ESCR_flag = 0x1; | /1 bit]*/ |
| ES_rate_flag = 0x0; | /1 bit]*/ |
| DSM_trick_mode_flag = 0x0; | /1 bit]*/ |
| additional_copy_info_flag = 0x0; | /1 bit]*/ |
| PES_CRC_flag = 0x0; | /1 bit]*/ |
| PES_extension_flag = 0x0; | /1 bit]*/ |
| PES_header_data_length = 0Xxx | /*8 [bit]*/ |

Finally, the PES-packetizing unit 116 receives the PES header thus generated by the above unit 114. The unit 116 generates MPEG2-PES packet with adding the PES header generated by the unit 114 into a head of the data of one AU stored in the buffer unit 115.

Although this embodiment illustrates the above fixed values in the PES headers, another value is available according to any applications.

Due to the first embodiment of the invention, the transport system obtains the time information such as ESCR, DTS, and PTS from the information on the MPEG4 stream STM1. It generates the PES header with including the time information therein and generates the MPEG2-PES packet with adding the PES header into the MPEG4 stream every AU, thereby transporting MPEG2-TS stream STM3 as its output signal. Since PES header of the MPEG2-PES packet includes the time information such as ESCR, DTS, and PTS, receiver side carries out the decoding thereof without a failure and the indication synchronizing with another stream.

(2) Second Embodiment of the Invention

Figure 4:
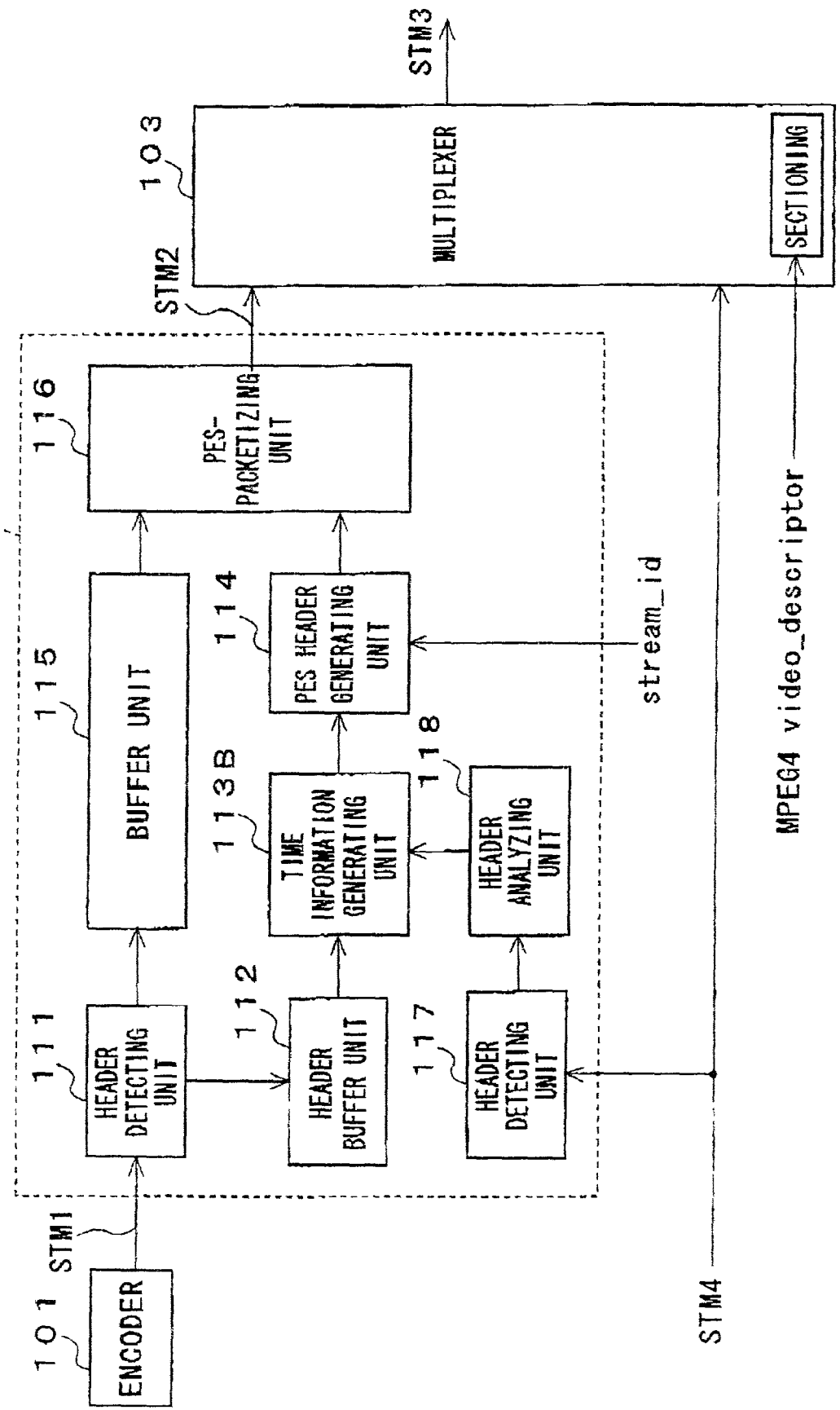
FIG. 4 is a block diagram depicting configuration of a transport system according to a second embodiment of the present invention.

FIG. 4 illustrates in a block diagram form configuration of a transport system 100B as a second embodiment of the invention. Since, in FIG. 4, like reference characters refer to like elements of FIG. 3, detailed explanation of these elements is omitted.

The transport system 100B comprises encoder 101 for encoding and transferring MPEG4 stream STM1, a packetizer 102B for receiving the MPEG4 stream STM1 from the encoder 101, translating it into MPEG2-PES packet and transferring a stream STM2 of MPEG2-PES packet form, and a multiplexer 103 for receiving and multiplexing the MPEG2-

PES packer stream STM2 from the packetizer 102B and transporting a stream STM3 of MPEG2-TS form as a transport output signal.

According to the transport system 100B, the MPEG4 stream STM1 transferred from the encoder 101 is supplied to the packetizer 102B, which translates it into MPEG2-PES packet. The stream STM2 of MPEG2-PES packet form transferred from the packetizer 102B is supplied to the multiplexer 103, which transports the stream STM3 of MPEG2-TS form as its output signal.

The packetizer 102B receives another stream STM4 of MPEG2-PES packet form from outside. The packetizer 102B detects PES header from the stream STM4, generates the time information such as ESCR, DTS, and PTS using information obtained by analyzing the PES header and includes it in the PES header.

The multiplexer 103 also receives the stream STM4 and transports it as the stream STM3 of the MPEG2-TS form. It also sections the information, MPEG4 video_descriptor and multiplexes the STM2 and the information, the MPEG4 video_descriptor thus sectioned to indicate that data contained in the STM2, which the multiplexer 103 receives, is MPEG4 stream.

The packetizer 102B further comprises a header detecting unit 117 for receiving and detecting PES headers from the stream STM4 of MPEG2-PES packet form and transferring them, a header analyzing unit 118 for receiving and analyzing the PES header detected by the unit 117 and obtaining necessary information therefrom, and a time information generating unit 113B for generating the time information such as ESCR, DTS, and PTS using the information given by the units 112 and 118. Remaining units of the packetizer 102B like the ones of the packetizer 102A in the transport system 100A as shown in FIG. 3 are respectively formed.

The stream STM4 of MPEG2-PES packet form is supplied to the header detecting unit 117, which detects the PES headers. The unit 117 detects one PES header from the stream STM4 whenever the header detecting unit 111 detects one header from the stream STM1 of the MPEG4 stream form.

The PES headers thus detected are supplied to the header analyzing unit 118, which analyzes them. The unit 118 detects the information, reference time (ESCR'), decoding time (DTS'), reproduction time (PTS'), a number of bytes (ESCR_byte') indicating a number of bytes occurred up to an ESCR' field, and ES_rate'.

The time information generating unit 113B receives the above information detected by the header analyzing unit 118. The unit 113B gets the time information such as PTS, DTS, and, ESCR, for "i"th AU as follows:

$PTS = vop\_time + m\_cnt + PTS'$;

$DTS = T*I + DTS'$; and $ESCR = 1/bit\_rate * 8 * (\Sigma AU[i-1] + ESCR\_byte) + ESCR\_base$ where $ESCR\_base = ESCR'/system\_clock\_frequency + (0 - ESCR\_byte')/(ES\_rate'*50)$, the above information, system_clock_frequency, is standardized according to MPEG2 standard, namely, 90 kHz, and remaining vales of the above formulae are respectively the same as those used in the first embodiment.

The PES header generating unit 114 receives the time information such as PTS, DTS, and, ESCR, thus generated by the time information generating unit 113B. It also generates other PES headers using the time information and the information, stream_id, supplied from outside. Since remaining operations of the packetizer 102B are the same as those of the packetizer 102A of the transport system 100A as shown in FIG. 3, detailed explanation thereof is omitted.

According to the second embodiment, the transport system 100B obtains the time information such as ESCR, DTS, and PTS from the information on MPEG4 stream STM1 and the information on another stream STM4 of the MPEG2-PES packet form. It generates the PES headers with including the time information therein and generates the MPEG2-PES packet with adding the PES header into the MPEG4 stream every AU, thereby transporting MPEG2-TS stream STM3 as its output signal. Since PES header of the MPEG2-PES packet includes the time information such as ESCR, DTS, and PTS, receiver side carries out the decoding thereof without a failure and the indication synchronizing with another stream.

Further, since, according to the second embodiment, the transport system 100B obtains the time information such as ESCR, DTS, and PTS from the information on another stream STM4 of the MPEG2-PES packet form, the input MPEG4 stream is translated into the stream STM2 of MPEG2-PES packet form with the stream STM4 being synchronized with the stream STM2. Therefore, receiver side may reproduce synchronously the stream STM2 with the stream STM4.

(3) Third Embodiment of the Invention

Figure 5:
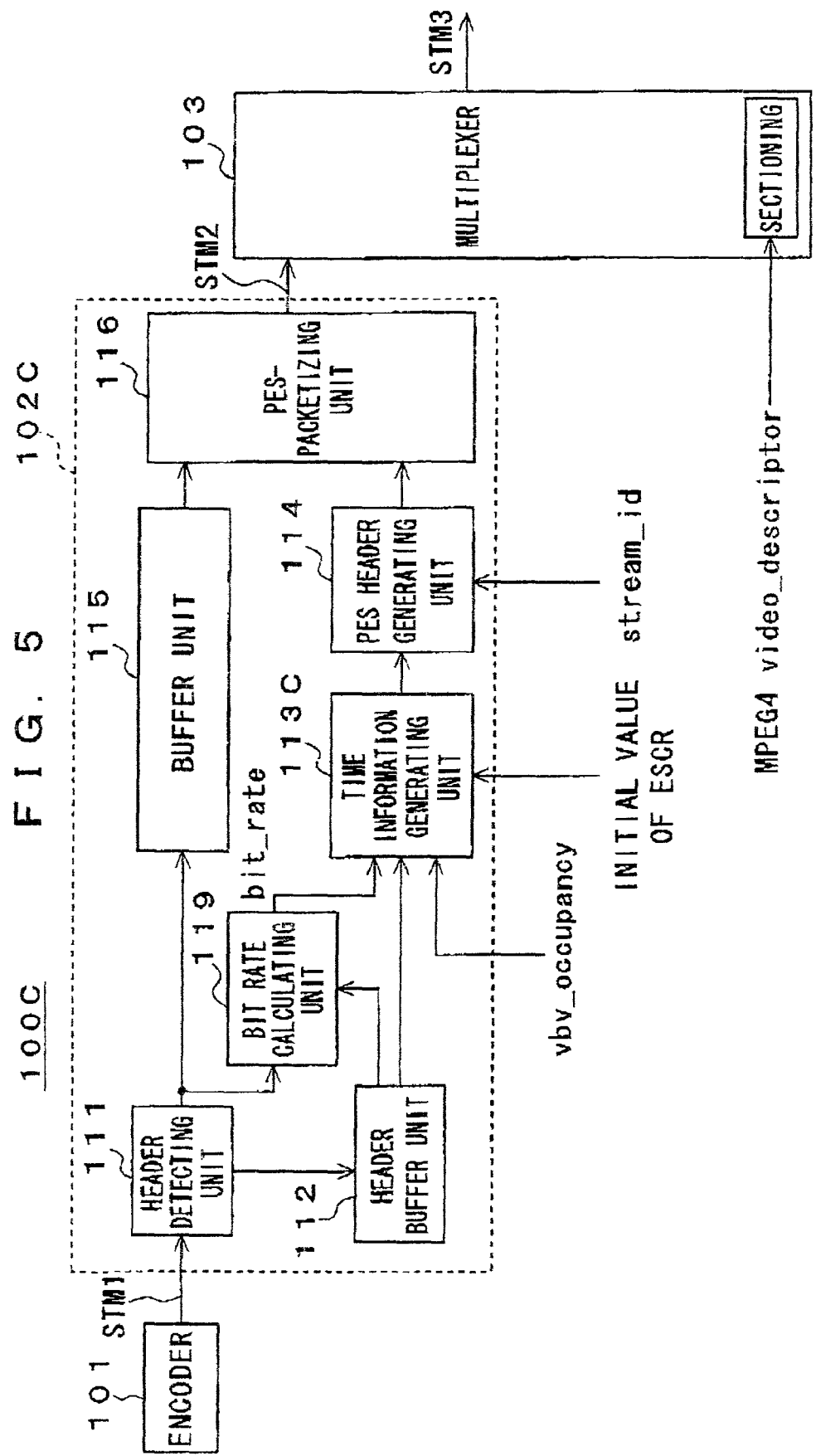
FIG. 5 is a block diagram depicting configuration of a transport system according to a third embodiment of the present invention.

FIG. 5 illustrates in a block diagram form configuration of a transport system 100C as a third embodiment of the invention. Since, in FIG. 5, like reference characters refer to like elements of FIG. 3, detailed, explanation of these elements is omitted.

The transport system 100C comprises encoder 101 for encoding and transferring MPEG4 stream STM1, a packetizer 102C for receiving the MPEG4 stream STM1 from the encoder 101, translating it into MPEG2-PES packet and transferring a stream STM2 of MPEG2-PES packet form, and a multiplexer 103 for receiving and multiplexing the MPEG2-PES packet stream STM2 from the packetizer 102C and transporting a stream STM3 of MPEG2-TS form as a transport output signal.

According to the transport system 100C, the MPEG4 stream STM1 transferred from the encoder 101 is supplied to the packetizer 102C, which translates it into MPEG2-PES packet. The stream STM2 of MPEG2-PES packet form transferred from the packetizer 102C is supplied to the multiplexer 103, which transports the stream STM3 of MPEG2-TS form as its output signal.

The packetizer 102C receives information, vbv_occupancy, indicating an occupancy of the data to be stored in the buffer unit until receiver side starts decoding from outside. The packetizer 102C generates the time information such as ESCR, DTS, and PTS using the information, vbv_occupancy and other information, bit_rate, calculated according to a frame rate obtained from the information obtained by analyzing the headers detected from MPEG4 stream SIM1, and the information, vbv_occupancy. It also inserts the time information into the PES header.

The multiplexer 103 receives and sections the information) MPEG4 video_descriptor and multiplexes the stream STM2 and the MPEG4 video_descriptor thus sectioned to indicate that data contained in the stream STM2, which the multiplexer 103 receives, is MPEG4 stream.

The packetizer 102C further comprises a bit rate calculating unit 119 for calculating a bit rate of the stream STM1. The unit 119 receives the input stream STM1 through the header detecting unit 111. The unit 119 also receives the information detected by the header buffer unit 112.

The unit 119 calculates a frame rate according to the information, vop_time_increment_resolution and fixed_vop_time_increment, detected by the header buffer unit 112 as follows:

frame rate [Hz]=$vop\_time\_increment\_resolution/fixed\_vop\_time\_increment$

The unit 119 also allows a number of AUs corresponding to the stream STM1 accessible for one second based an the frame rate thus calculated to be accessed. It counts an amount of the data, a number of bytes, of accessed AU and gets the information, bit_rate, indicating a bit rate of the stream STM1.

The time information generating unit 113C receives the information, bit_rate, thus obtained by the unit 119. The unit 113C also receives the information detected by the header buffer unit 112. It receives the information, vbv_occupancy, and initial value of ESCR from outside.

The unit 113C generates the time information such as ESCR, DTS, and PTS using the information, vbv_occupancy and bit_rate, and the information detected by the header buffer unit 112 as the necessary information other than the above one, like the time information generating unit 113A of the transport system 100A as shown in FIG. 3.

The PES header generating unit 114 receives the time information, ESCR, DTS, PTS thus generated by the unit 113C. The unit 14 generates the PES header using the time information and stream identification information, stream_id, supplied from outside. Since remaining configuration and operations of the packetizer 102C are the same as those of the packetizer 102A of the transport system 100A as shown in FIG. 3, detailed explanation thereof is omitted.

According to the third embodiment, the transport system 100C obtains the time information such as ESCR, DTS, and PTS from the information on the MPEG4 stream STM1, the information, bit_rate, calculated by the bit rate calculating unit 119 and the information, vbv_occupancy, supplied from outside. It generates the PES header with including the time information therein and generates the MPEG2-PES packet with adding the PES header into the MPEG4 stream every AU, thereby transporting MPEG2-TS stream STM3 as its output signal. Since the PES header of the MPEG2-PES packet includes the time information such as ESCR, DTS, and PTS, receiver side carries out the decoding thereof without a failure and the indication synchronizing with another stream.

Further, according to the third embodiment, the transport system 100C uses the information, bit_rate, calculated by the bit rate calculating unit 119 and the information, vbv_occupancy, supplied from outside when it obtains the time information such as ESCR, DTS, and PTS, Thus, if there is no information for getting the information, bit_rate and vbv_occupancy on the stream STM1, it appropriately generates the time information.

(4) Forth Embodiment of the Invention

Figure 6:
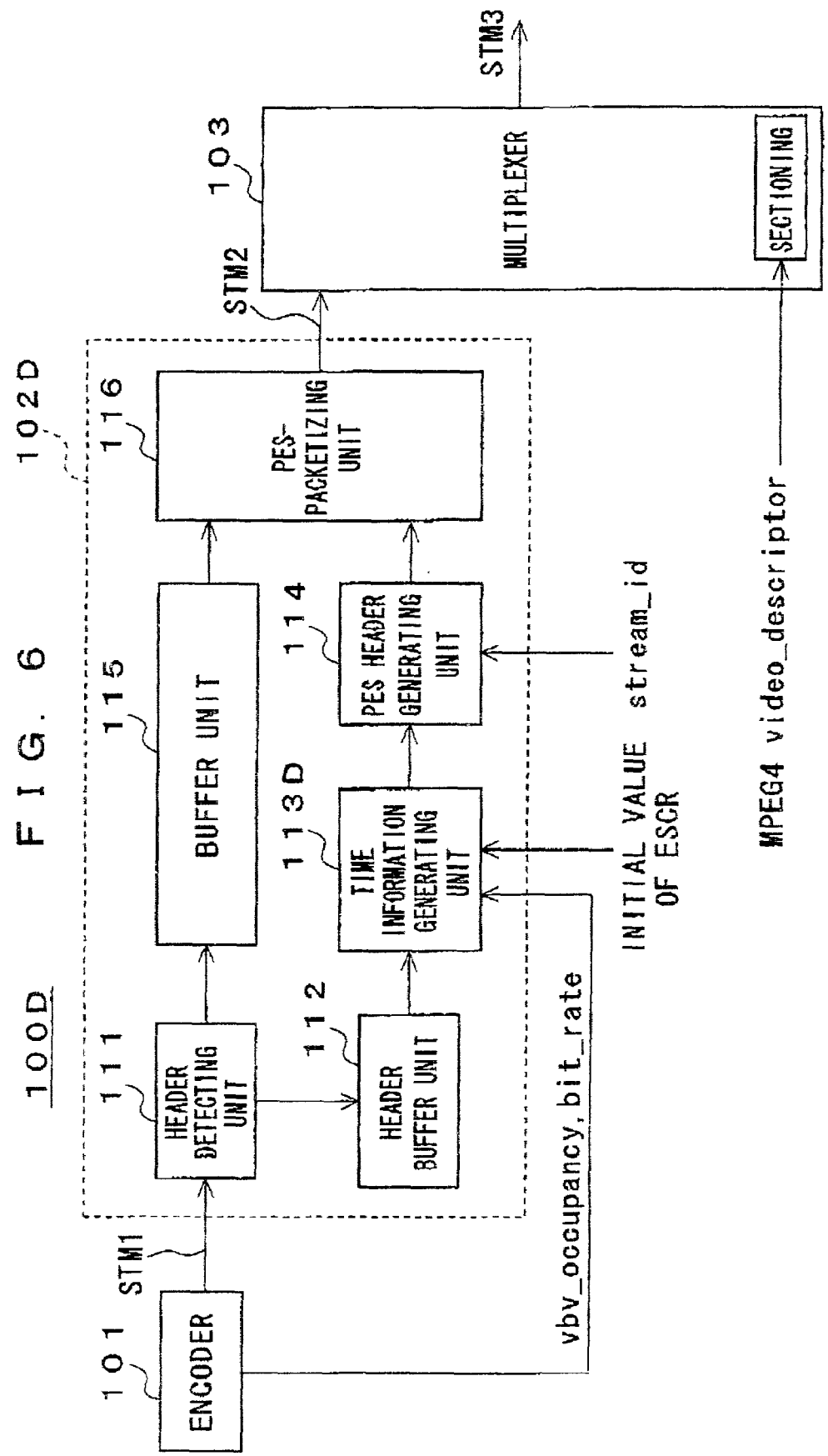
FIG. 6 is a block diagram depicting configuration of a transport system according to a forth embodiment of the present invention.

FIG. 6 illustrates in a block diagram form configuration of a transport system 100D as a forth embodiment of the invention. Since, in FIG. 6, like reference characters refer to like elements of FIG. 3, detailed explanation of these elements is omitted.

The transport system 100D comprises encoder 101 for encoding and transferring MPEG4 stream STM1, a packetizer 102D for receiving the MPEG4 stream STM1 from the encoder 101, translating it into MPEG2-PES packet and transferring a stream STM2 of MPEG2-PES packet form, and a multiplexer 103 for receiving and multiplexing the MPEG2-PES packet stream STM2 from the packetizer 102D and transporting a stream STM3 of MPEG2-TS form as a transport output signal.

According to the transport system 100D, the MPEG4 stream STM1 transferred from the encoder 101 is supplied to the packetizer 102D, which translates it into MPEG2-PES packet. The stream STM2 of MPEG2-PES packet form transferred from the packetizer 102D is supplied to the multiplexer 103, which transports the stream STM3 of MPEG2-TS form as its output signal.

The packetizer 112D receives the information vbv_occupancy, indicating an occupancy of the data to be stored in the buffer unit until receiver side starts decoding, and the information, bit_rate, indicating a bit rate of the MPEG4 stream STM1, respectively from the encoder 101. The packetizer 102D generates the time information such as ESCR, DTS, and PTS using the information, vbv_occupancy and bit_rate. The packetizer 102D also includes the time information into the PES header.

The multiplexer 103 receives and section, the information, MPEG4 video_descriptor and multiplexes the STM2 and the MPEG4 video_descriptor thus sectioned to indicate that data contained in the STM2, which the multiplexer 103 receives, is MPEG4 stream.

The time information generating unit 113D receives the information, vbv_occupancy and bit_rate, from the encoder 101. It also receives the information detected by the header buffer unit 112 and initial value of ESCR from outside.

The unit 113D generates the time information such as ESCR, DTS, and PTS using the information, vbv_occupancy and bit_rate, supplied from the encoder 101 and the information detected by the header buffer unit 112 as the necessary information other than the above one, like the time information generating unit 113A of the transport system 100A as shown in FIG. 3.

The PES header generating unit 114 receives the time information, ESCR, DTS, PTS thus generated by the unit 113D. The unit 114 generates the PES header using the time information and stream identification information, stream_id, supplied from outside. Since remaining configuration and operations of the packetizer 102D are the same as those of the packetizer 102A of the transport system 100A as shown in FIG. 3, detailed explanation thereof is omitted.

According to the forth embodiment, the transport system 100D obtains the time information such as ESCR, DTS, and PTS from the information on the MPEG4 stream STM1, and the information, vbv_occupancy and bit_rate, supplied from the encoder 101. It generates the PES header with including the time information therein and generates the MPEG2-PES packet with adding the PES header into the MPEG4 stream every AU, thereby transporting MPEG2-TS stream STM3 as its output signal. Since the PES header of the MPEG2-PES packet includes the time information such as ESCR, DTS, and PTS, receiver side carries out the decoding thereof without a failure and the indication synchronizing with another stream.

Further, according to the forth embodiment, the transport systems 100D uses the information, vbv_occupancy and bit_rate, supplied from the encoder 101 when it obtains the time information such as ESCR, DTS, and PTS. Thus, if there is no information for getting these bit_rate and vbv_occupancy on the stream STM1, it appropriately generates the time information.

(5) Fifth Embodiment of the Invention

Figure 7:
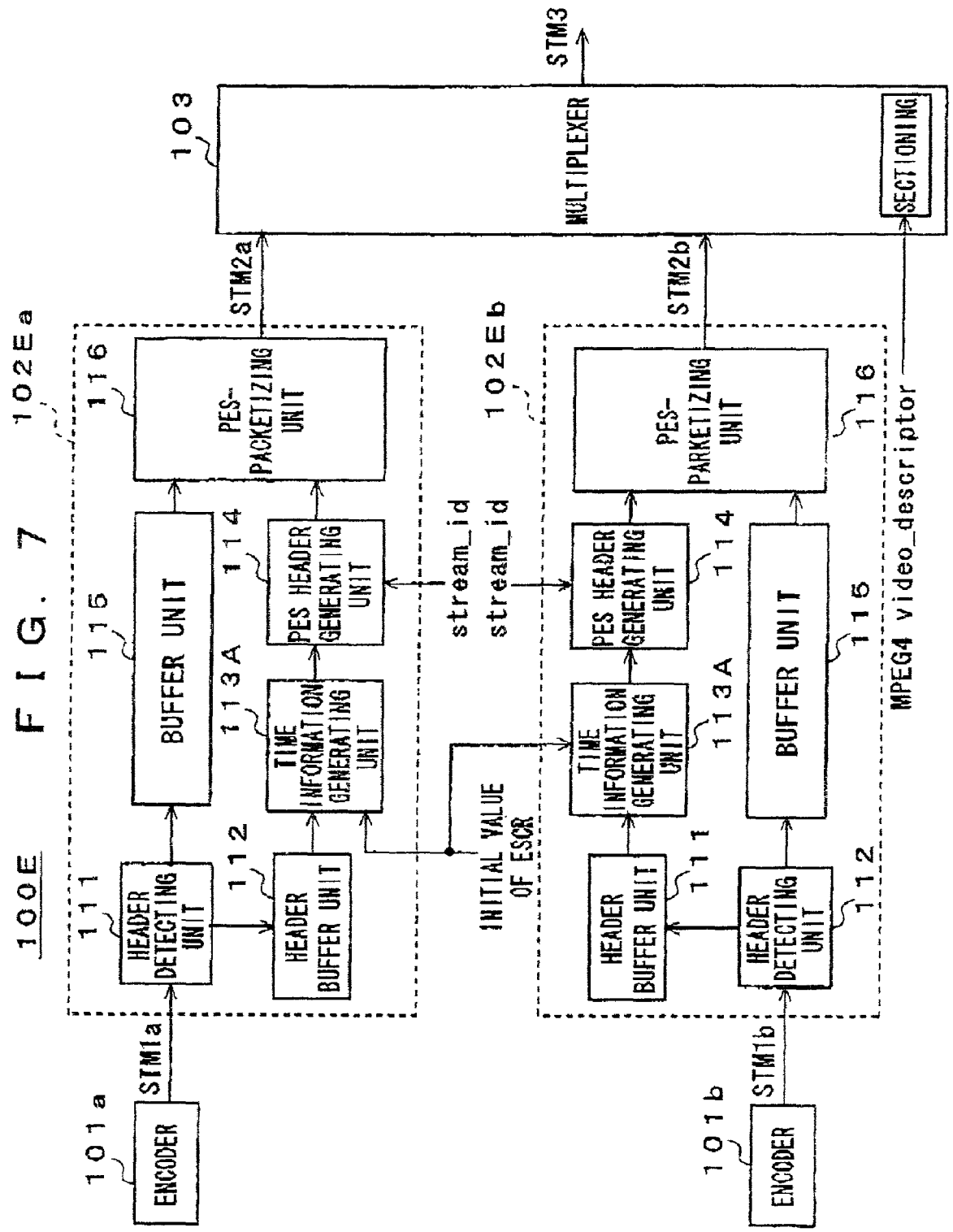
FIG. 7 is a block diagram depicting configuration of a transport system according to a fifth embodiment of the present invention.

FIG. 7 illustrates in a block diagram form configuration of a transport system 100E as a fifth embodiment of the invention. Since, in FIG 7, like reference characters refer to like elements of FIG. 3, detailed explanation of these elements is omitted.

The transport system 100E comprises encoder 101a for encoding and transferring MPEG4 stream STM1a, a packetizer 102Ea for receiving the MPEG4 stream STM1a from the encoder 101a, translating it into MPEG2-PES packet and transferring a stream STM2a of MPEG2-PES packet form, encoder 101b for encoding and transferring MPEG4 stream STM1b, a packetizer 102Eb for receiving the MPEG4 stream STM1b from the encoder 101b, translating it into MPEG2-PES packet and transferring a stream STM2b of MPEG2-PES packet form, and a multiplexer 103 for receiving and multiplexing the MPEG2-PES packet streams STM2a and STM2b from the packetizers 102Ea and 102Eb and transporting a stream STM3 of MPEG2-TS form as a transport output signal.

According to the transport system 100E, the MPEG4 stream STM1a transferred from the encoder 101a is supplied to the packetizer 102Ea, which translates it into MPEG2-PES packet. The MPEG4 stream STM1b transferred from the encoder 101b is supplied to the packetizer 102Eb, which translates it into MPEG2-PES packet. The streams STM2a and STM2b of MPEG2-PES packet form transferred from the packetizers 102Ea and 102Eb are supplied to the multiplexer 103, which transports the stream STM3 of MPEG2-TS form as its output signal.

The multiplexer 103 receives and sections the information, MPEG4 video_descriptor and multiplexes the streams STM2a and STM2b and the MPEG4 video_descriptor thus sectioned to indicate that data contained in the multiplexed MPEG2-PES packet is MPEG4 stream.

Each of the packetizers, 102Ea and 102Eb, is so configured as to be the same as the packetizer 102A of the transport system 100A as shown in FIG. 3. The time information generating unit 113A of the packetizer 102Ea generates the time information such as ESCR, DTS, and PTS using the information detected by the header buffer unit 112 and initial value of ESCR supplied from outside. The PES header generating unit 114 of the packetizer 102Ea generates the PES header with including the time information therein.

The time information generating unit 113A of the packetizer 102Eb generates the time information such as ESCR, DTS, and PTS using the information detected by the header buffer unit 112 and initial value of ESCR supplied from outside. The PES header generating unit 114 of the packetizer 102Eb generates the PES header with including such the time information therein. The initial value supplied to the time information generating unit 113A of the packetizer 102Eb is set to be the same as the one supplied to the time information generating unit 113A of the packetizer 102Ea.

Since remaining operations of the packetizers 102Ea and 102Eb are the same as those of the packetizer 102A of the transport system 100A as shown in FIG. 3, detailed explanation thereof is omitted.

According to the fifth embodiment, the transport system 101E obtains the time information such as ESCR, DTS, and PTS from the information on the MPEG4 streams STM1a and STM1b. It generates the PES header with including the time information therein and generates the MPEG2-PES packet with adding the PES header into the MPEG4 stream every AU, thereby transporting MPEG2-TS stream STM3 as its output signal. Since PES header of the MPEG2-PES packet includes the time information such as ESCR, DTS, and PTS, receiver side carries out the decoding thereof without a failure and the indication synchronizing with another stream.

Further, according to the fifth embodiment, each of the time information generating units 113A, 113A of the packetizers 102Ea and 102Eb receives common initial value of ESCR and generates the time information such as ESCR, DTS, and PTS, thereby generating the time information based on the same time axis. Therefore, the packetizers, 102Ea, 102Eb, sequentially transfer MPEG2-PES packets each having the PES header including the time information generated according to the same time axis.

(6) Sixth Embodiment of the Invention

Figure 8:
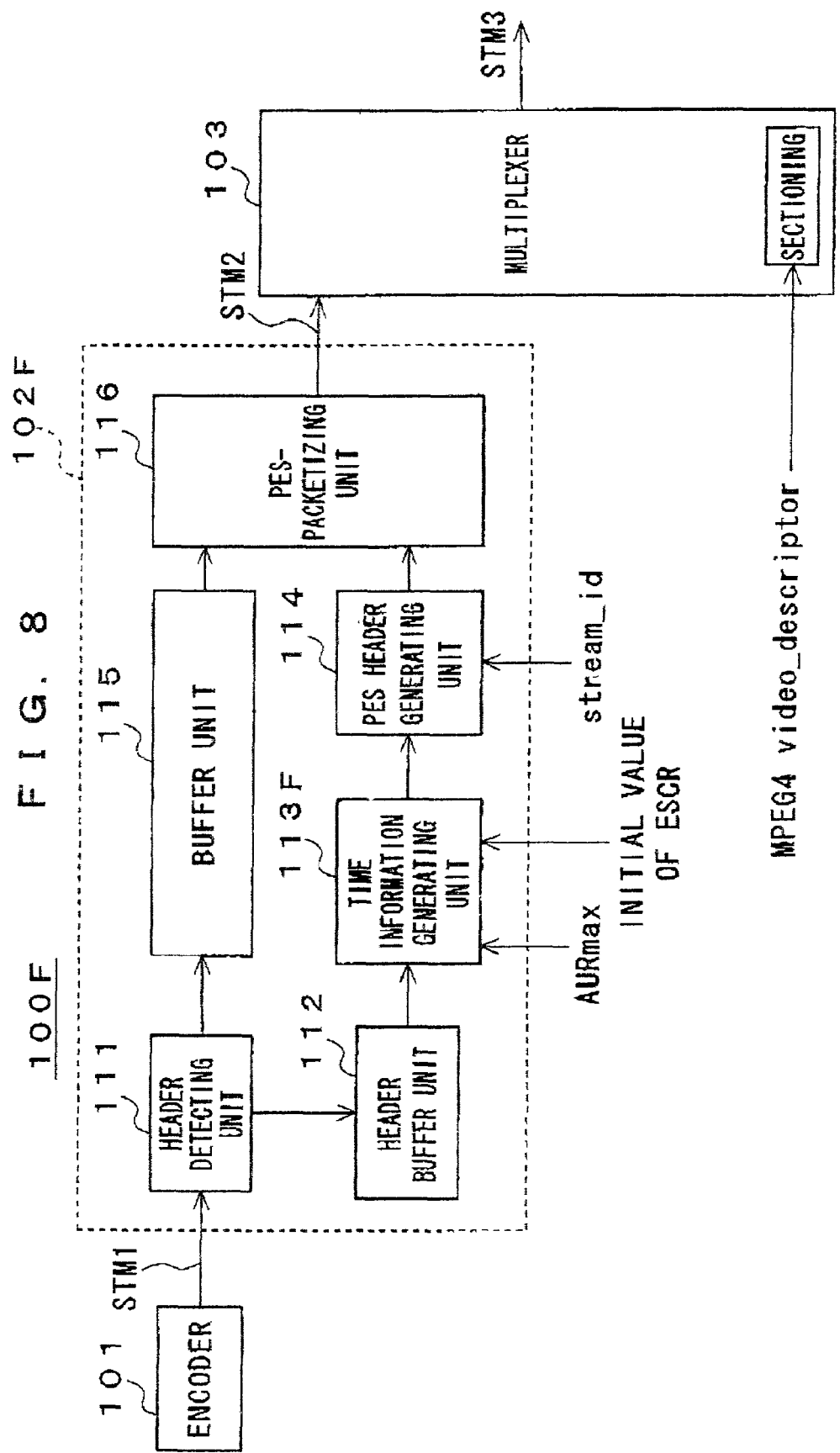
FIG. 8 is a block diagram depicting configuration of a transport system according to a sixth embodiment of the present invention.

FIG. 8 illustrates in a block diagram form configuration of a transport system 100F as a sixth embodiment of the invention. Since, in FIG. 8, like reference characters refer to like elements of FIG. 3, detailed explanation of these elements is omitted.

The transport system 100F comprises encoder 101 for encoding and transferring MPEG4 stream STM1, a packetizer 102F for receiving the MPEG4 stream STM1 from the encoder 101, translating it into MPEG2-PES packet and transferring a stream STM2 of MPEG2-PES packet form, and a multiplexer 103 for receiving and multiplexing the MPEG2-PES packet streams STM2 from the packetizer 102F and transporting a stream STM3 of MPEG2-TS form as a transport output signal.

According to the transport system 100F, the MPEG4 stream STM1 transferred from the encoder 101 is supplied to the packetizer 102F, which translates it into MPEG2-PES packet. The stream STM2 of MPEG2-PES packet form transferred from the packetizer 102F is supplied to the multiplexer 103, which transports the stream STM3 of MPEG2-TS form as its output signal. The multiplexer 103 receives and sections the information, MPEG4 video_descriptor and multiplexes the stream STM2 and the MPEG4 video_descriptor thus sectioned to indicate that the data contained in the multiplexed MPEG2-PES packet is MPEG4 stream.

The packetizer 102F comprises a header detecting unit 111 for receiving MPEG4 stream STM1 and detecting headers from the stream STM1, a header buffer unit 112 for receiving the headers detected by the header detecting unit 111, storing them one by one, and detecting information required to generate the time information such as ESCR, DTS, and PTS to be inserted into the header of MPEG2-PES packet, and a time information generating unit 113F for generating the time information using the information detected by the header buffer unit 112, initial value of ESCR supplied from outside, and maximum bit rate AURmax supplied from outside.

The packetizer 102F further comprises a PES header generating unit 114 for generating a PES header using the time information such as ESCR, DTS, and PTS generated by the time information generating unit 113F and the information, stream_id, supplied from outside.

It also comprises a buffer unit 115 for storing input MPEG4 stream STM1 in sequence on one AU basis, and a PES-packetizing unit 116 for generating MPEG2-PES packet with adding the PES header generated by the PES header generating unit 114 into a head of the data of one AU stored in the buffer unit 115. Here, the essential components of MPEG4 stream STM1 of one AU are VOPs, and a first AU comprises a header portion of upper layer before a first VOP.

In the packetizer 102F, the MPEG4 stream STM1 transferred from the encoder 101 is supplied to the header detecting unit 111, which detects the headers on the stream. The headers detected by the unit 111 are supplied to the header buffer unit 112, which stores them one by one.

The header detecting unit 111 counts a number of AUs assuming that one AU is detected if the unit 111 detects the header other than the VOP header when detecting the VOP header, and keeps the counts as a variable (AUcnt). Further it also counts a number of bytes in each AU and keeps it as a variable (AU[i]) every AU where "i" is a number included in the interval, $1 \leq i \leq$ AUcnt and indicates detected order of the AUs. The time information generating unit 113F uses these variables (AUcnt and AU[i]) when generating the time information such as ESCR, DTS, and PTS, as will be described hereinafter. When MPEG4 data has completed, it processes final AU of the MPEG4 stream STM1 as if it might detect one AU.

The buffer unit 115 receives input MPEG4 streams STM1 and stores them in sequence on one AU basis. The header buffer 112 analyzes the headers stored therein and detects the information as follows:

first_half_vbv_occupancy, latter_half_vbv_occupancy, first_half_bit_rate, latter_half_bit_rate, vop_time_increment_resolution, and fixed_vop_time_increment, are detected from a header of the Video_Object_Layer; and vop_coding_type, modulo_time_base, vop_time_increment, are detected from a header of the Video_Object_Layer.

The time information generating unit 113F receives the above information detected by the header buffer unit 112. The unit 113F generates the time information such as ESCR, DTS, and PTS using the information obtained by analyzing the headers, the variables (AUcnt and AU[i]) kept in the header detecting unit 111, maximum bit rate, AURmax, supplied from outside and initial value of the ESCR supplied from outside.

I will explain operations for generating the time information. The unit 113F initially calculates an occupancy of the data, vbv_occupancy, to be stored in the buffer of receiver side until starting the decode after receiver side receives the data as follows:

$vbv$_occupancy=first_half_$vbv$_occupancy*0x8000+ latter_half_$vbv$_occupancy.

Next, the unit 113F gets the time (T) to be updated on one AU basis by calculating it as follows:

$T$ [sec]=fixed_vop_time_increment/vop_time_increment_resolution.

According to the following operations, the unit 113F gets DTS, PTS and ESCR, each for "i"th AU where I set differential time when a preceding AU is PES-packetized (the excess time over time for one frame) as $S_{i-1}$ [sec].

1. Time AUT [i] for transporting "i"th AU (size AU [i]) is calculated as follows:

$AUT$ $[i]$=$T$-$S_{i-1}$

2. Transporting rate AUR [i] when transporting "i"th AU (size AU [i]) is calculated as follows:

If $AUT$ $[i] \leq 0$, then $AUR$ $[i]$=$AUR$max; and

If $AUT$ $[i]$>0, then $AUR$ $[i]$=$AU$ $[i]$/$AUT$ $[i]$

3. According to the calculated AUR [i], time for real transport AUT [i] is calculated as follows:

$AUT$ $[i]$=$AU$ $[i]$/$AUR$ $[i]$

4. The differential time Si to be used when "i+1"th AU is PES-packetized is calculated as follows:

$Si$=$S_{i-1}$+$AUT$ $[i]$-$T$

5. According to the calculated bit rate AUR [i], DTS_Offset is calculated as follows:

$DTS$_Offset=(64*$vbv$_occupancy)/$AUR$ $[i]$

6. According to the results thereof, DTS (decoding time) is calculated as follows:

$DTS$ =$T$*$i$+$DTS$_Offset+$ESCR$_base where ESCR_base=initial value of ESCR

7. A number (m_cnt) of "1" included in the information, modulo_time_base is counted. The number, m_cnt, indicates how many seconds it takes for a picture to occur after I-picture.

Therefore, m_cnt=a number of "1" included in modulo_time_base

8. The information, vop_time, for indicating the reproduction time is calculated as follows:

vop_time=vop_time_increment/vop_time_increment_resolution

9. According to these calculated values, reproduction time, PTS, is calculated as follows:

$PTS$=$vop$_time+$m$_$cnt$+$DTS$_Offset+$ESCR$_base

10. A number of bytes from a top of the PES header to an ESCR field is calculated on one AU basis and they are set as ESCR_byte.

11. According to the results thereof, reference time, ESCR, is calculated as follows:

$ESCR$=1/$AUR$ $[i]$*8*($\Sigma AU$ $[i-1]$+$ESCR$_byte)+ $ESCR$_base

The PES header generating unit 114 receives the time information. ESCR, DTS, PTS thus generated by the time information generating unit 113F. The unit 14 generates the PES header using these time information and stream identification information, stream_id, supplied from outside. The unit 114 generates the PES header on one AU basis.

The PES-packetizing unit 116 receives the PES headers thus generated by the above unit 114. The unit 116 generates MPEG2-PES packet with adding the PES header generated by the unit 114 into a head of the data of one AU stored in the buffer unit 115.

According to the sixth embodiment, the transport system 100F obtains the time information such as ESCR, DTS, and PTS from the information on the MPEG4 streams STM1 and the information of AURmax supplied from outside. It generates the PES header with including the time information therein and generates the MPEG2-PES packet with adding the PES header into the MPEG4 stream every AU, thereby transporting MPEG2-TS stream STM3 as its output signal. Since PES header of the MPEG2-PES packet includes the time information such as ESCR, DTS, and PTS, receiver side carries out the decoding thereof without a failure and the indication synchronizing with another stream.

Further, according to the sixth embodiment the time information generating unit 113F receives the information, AURmax, indicating maximum bit rate from outside, thereby generating the time information with limiting maximum value of the bit rate. Therefore, this allows the PES-packetizing to be performed at any bit rates that are available to a transport line.

(7) Seventh Embodiment of the Invention

Figure 9:
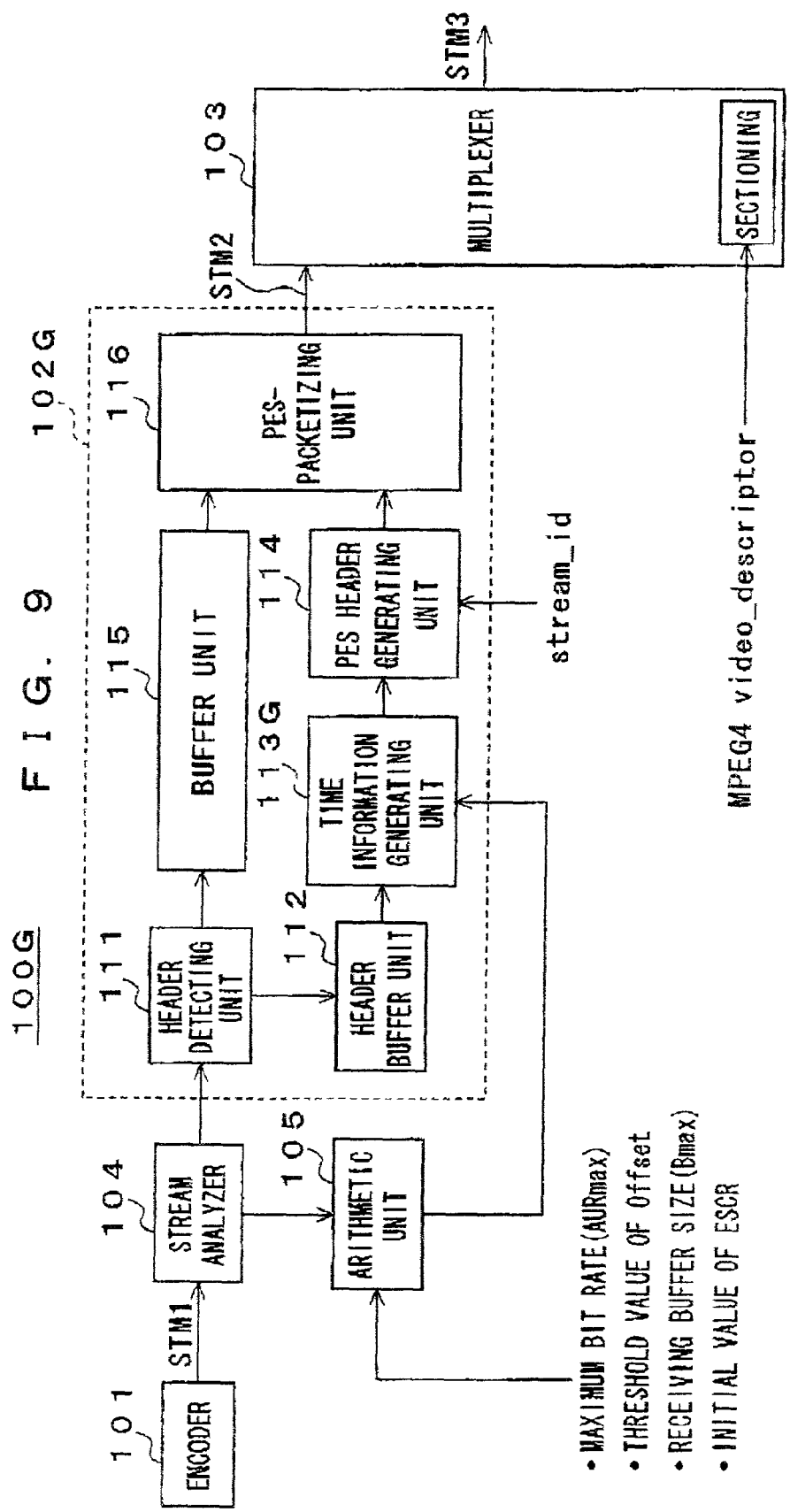
FIG. 9 is a block diagram depicting configuration of a transport system according to a seventh embodiment of the present invention.

FIG. 9 illustrates in a block diagram form configuration of a transport system 100G as a seventh embodiment of the invention. Since, in FIG. 9, like reference characters refer to like elements of FIG. 3, detailed explanation of these elements is omitted.

The transport system 100G comprises encoder 101 for encoding and transferring MPEG4 stream STM1, a stream analyzer 104 for receiving and analyzing the MPEG4 stream STM1 from the encoder 101 and detecting predetermined information, and an arithmetic unit 105 for performing arithmetic progression on the frame rate FR, the bit rate AUR [i] every AU, the transport time AUT [i] every AU, and the reproduction time DTS [i] every AU according to the information detected by the stream analyzer 104. The arithmetic unit 105 receives maximum bit rate AURmax, threshold value of Offset, receiving buffer size Bmax, and initial value of ESCR.

The transport system 100G further comprises a packetizer 102G for receiving MPEG4 stream STM1 through the stream analyzer 104, translating it into MPEG2-PES packet and transferring a stream STM2 of MPEG2-PES packet form, and a multiplexer 103 for receiving and multiplexing the MPEG2-PES packet streams STM2 from the packetizer 102G and transporting a stream STM3 of MPEG2-TS form as a transport output signal.

According to the transport system 100G, the MPEG4 stream STM1 transferred from the encoder 101 is supplied to the stream analyzer 104. The analyzer 104 analyzes the stream STM1 to detect the following information:

Total number of AUs in a stream, AUcnt;

Size of each of the AUs, AU [i], where "i" is an integer included in the interval between $1 \leq i \leq AUcnt$ and indicates "i"th AU from the top thereof (so does the following);

vop_time_increment_resolution; and fixed_vop_time_increment

The stream STM1 thus analyzed in the analyzer 104 is supplied to the packetizer 102G, which translates it into MPEG2-PES packet.

The arithmetic unit 105 receives the information thus detected by the analyzer 104. The unit 105 calculates the information such as the frame rate FR, the bit rate AUR [i] every AU, the transport time AUT [i] every AU, and the reproduction time DTS [i] every AU according to the information detected by the analyzer 104.

The respective pieces of the above information will be calculated as follows:

(a) Frame Rate $$FR = vop\_time\_increment\_resolution/fixed\_vop\_time\_increment;$$

(b) Bit Rate every AU and Transport Time every AU Suppose that differential time after transferring AU [i−1] is "S". The differential time S is set to the integral of the difference between the transport time if AU is transported at 1/FR, which means time for representing data of one frame, and real transport time AUT [i]. If the differential time S is not less than 1/FR, then AUR [i] is set to maximum bit rate AURmax. This AURmax is supplied from outside. Therefore, $$S \geq 1/FR \rightarrow AUR\ [i] = AURmax$$

If the differential time S is less than 1/FR, then the formula, AUR [i]=AU [i]/(1/FR−S), is used and AUR [i] is calculated.
Therefore, $$S < 1/FR \rightarrow AUR\ [i] = AU\ [i]/(1/FR-S)$$

If calculated AUR [i] exceeds AURmax, then it is modified to AURmax.
Therefore, $$AUR[i] > AURmax \rightarrow AUR\ [i] = AURmax$$

According to the fixed AUR [i], a formula, AUT [i]=AU [i]/AUR [i], is used and the transport time AUT [i] of "i"th AU is calculated on the basis of the formula.
Therefore, $$AUT[i] = AU[i]/AUR\ [i]$$

The differential time S is updated following a formula, $S = S + AUT\ [i] - (1/FR)$ (c) Reproduction Time every AU The differential, DTS_Offset, between the initial value of the ESCR and DTS is firstly set to one [sec]. Thereafter, the differential, DTS_Offset, is calculated and modulated. As the initial value of the ESCR, the one supplied from outside is used.
Therefore, $$DTS\ [i] = (1/FR)*i + DTS\_Offset + ESCR\_base$$

The arithmetic unit 105 performs advanced calculation on variations in the data occupancy in the buffer being ready for a receiver side to prevent the receiver side from a failure. Generating the time information according to the calculated results reliably allows it to be translated into PES without a failure of receiver side.

According to the following operations, the arithmetic unit 105 gets the data occupancy, B_occ [i], stored in the buffer of the receiver side until the time of DTS [i] on one AU basis.

1. The time between DTS [i−1] and DTS [i] is set to SJ, it is calculated as follows:

$$SJ = DTS\ [i]\ and\ DTS\ [i-1]$$

2. Regarding a first AU, however, SJ is calculated as follows:

$$SJ = DTS\ [1] - ESCR\_base$$

3. When preceding AU is decoded, if AU [i−1] is being input, the buffer receives the remaining data SD [i−1]. If a first AU, SD [i−1] is set to zero.
Therefore, $$SJ > SD[i-1]/AUR[j-1] \rightarrow B\_occ[i] = B\_occ[i] + SD[i-1]$$

$$SJ = SJ - SD[i-1]/AUR[j-1]$$

4. New input data of AU, for example, data from "j"th AU to halfway of "j+2"th AU, is input. Whenever the buffer receives the data, it subtracts the time, for example, AUT[j], for receiving the data from SJ and then stops receiving the data when SJ falls to zero. The data of "j"th AU is supplied to the buffer.
Therefore, $$SJ > AUT[j] \rightarrow B\_occ[i] = B\_occ[i] + AUR[j]*AUT[j]$$

$$SJ = SJ - AUT[j]$$

The data of "j+1"th AU is supplied to the buffer.
Therefore, $$SJ > AUT[j+1] \rightarrow B\_occ[i] = B\_occ[i] + AUS[j+1]*AUT[j+1] SJ = SJ - AUT[j+1]$$

The data of "j+2"th AU is supplied to the buffer.
If AU[j+2] exceeds the SJ, then the date of the SJ is supplied.
Therefore, $$SJ \leq AUT[j+2] \rightarrow B\_occ[i] = B\_occ\ [i] + AUR[j+2]*SJ$$

5. Remaining data, SD [i], of AU[j+2] is calculated as follows:

$$SD[i]=AUS[j+2]-AUR[j+2]*SJ$$

6. A number, j+2, of finally received AU is stored.
7. The initial value of data occupancy of the buffer after decoding the data of "i"th AU is calculated. The data of "i+1"th AU is set to the calculated initial value of the data occupancy of buffer until decoding the data of "i+1"th AU.
Therefore, $$B\_occ[i+1]=B\_occ[i]-AU[j]$$

8. Next, the process goes to step.1 in order to get data occupancy of the buffer until decoding the data of "i+1"th AU.

The above operations are repeated up to decoding of the data of all the AUs so that the data occupancy, B_occ [I], of the buffer when respectively decoding the data of the AUs can be obtained. It detects "i" having maximum number of calculated occupancy, B_occ [i], and gets the differential BS between buffer size Bmax received from outside and the B_occ [i].
Therefore, $$BS=Bmax-B\_occ[i]$$

If BS≦SD[i], then it divides BS by bite rate AUR[j+2] of the data of AU last received when calculating the occupancy, B_occ[i] and gets the time, Offset, for transferring the data of BS.
Therefore, If Offset=BS/AUR[j+2] and BS>SD[i], then the Offset is calculated as follows:

$$Offset=SD[i]/AUR[j+2]+(BS-SD[i]/AUR[j+3])$$

According to the Offset value thus calculated, the information, DTS_Offset, is re-calculated. Then DTS[i] is again gotten on an AU basis. If Offset value exceeds the interval between 0≦Offset≦a threshold value of the Offset, then it re-calculates variations of the data occupancy of the buffer on receiver side and newly gets values of the Offset.

The time information generating unit 113G of the packetizer 102G receives the above information, DTS[i] and DTS_Offset every AU, frame rate FR, bit rate AUR[i] every AU, and the initial value of ESCR, each calculated by the arithmetic 105. The unit 113G generates the time information such as ESCR and PTS using the information supplied from the arithmetic unit 105 and the information detected by the header buffer unit 112 like the time information generating unit 113F of the transport system 100F.

The PES header generating unit 114 receives the time information, ESCR, DTS and PTS from the time information generating unit 113G, The unit 14 generates the PES header using the above time information and stream identification information, stream_id, supplied from outside. The unit 114 generates the PES header on detected one AU basis.

The PES-packetizing unit 116 receives the PES header thus generated by the above PES header generating unit 114. The unit 116 generates MPEG2-PES packet with adding the PES header generated by the unit 114 into a head of the data of one AU stored in the buffer unit 115.

The stream STM2 of MPEG2-PES packet form transferred from the packetizer 102G is supplied to the multiplexer 103, which transports the stream STM3 of MPEG2-TS form as its output signal. The multiplexer 103 sections the information, MPEG4 video_descriptor and multiplexes the stream STM2 and the MPEG4 video_descriptor thus sectioned to indicate that data contained in the STM2, which the multiplexer 103 receives, is MPEG4 stream.

Since remaining constitution and operations of the transport system 100G are the same as those of the transport system 100A as shown in FIG. 3, detailed explanation thereof is omitted.

According to the seventh embodiment, the transport system 100G obtains the time information such as ESCR, DTS, and PTS from the information on the MPEG4 streams STM1 and the information supplied from the arithmetic unit 105. It generates the PES header with including the time information therein and generates the MPEG2-PES packet with adding the PES header into the MPEG4 stream every AU, thereby transporting MPEG2-TS stream STM3 as its output signal. Since PES header of the MPEG2-PES packet includes the time information such as ESCR, DTS, and PTS, receiver side carries out the decoding thereof without a failure and the indication synchronizing with another stream.

Further, according to the seventh embodiment, the arithmetic unit 105 calculates the information, DTS_Offset, without using the information, vbv_occupancy, on the data occupancy until the start of decoding in the buffer of receiver side, thereby generating the time information such as DTS and PTS in the arithmetic unit 105 and the time information generating unit 113G using the DTS_Offset. Therefore, this allows the transport system 100G to generate the time information suitably if the information, vbv_occupancy, is unavailable.

(8) Eighth Embodiment of the Invention

Figure 10:
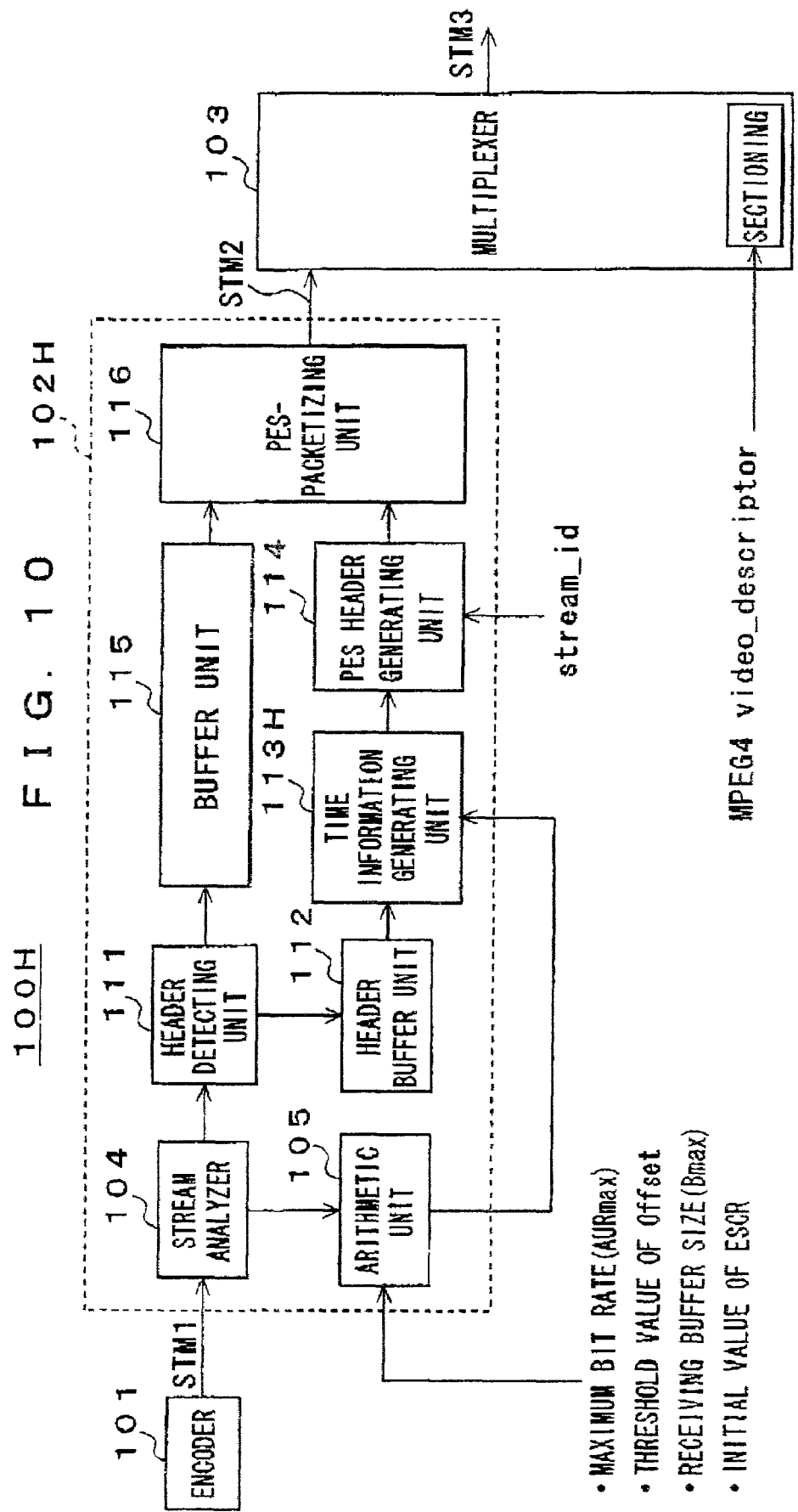
FIG. 10 is a block diagram depicting configuration of a transport system according to an eighth embodiment of the present invention.

FIG. 10 illustrates in a block diagram form configuration of a transport system 100H as an eighth embodiment of the invention. Since, in FIG. 10, like reference characters refer to like elements of FIG. 3, detailed explanation of these elements is omitted.

The transport system 100H comprises encoder 101 for encoding and transferring MPEG4 stream STM1, a packetizer 102H for receiving the MPEG4 stream STM1 from the encoder 101, translating it into MPEG2-PES packet and transferring a stream STM2 of MPEG2-PES packet form, and a multiplexer 103 for receiving and multiplexing the MPEG2-PES packet streams STM2 from the packetizer 102H and transporting a stream STM3 of MPEG2-TS form as a transport output signal.

The packetizer 102H comprises a stream analyzer 104 for receiving and analyzing the MPEG4 stream STM1 from the encoder 101 and detecting predetermined information, and an arithmetic unit 105 for performing arithmetic progression on the frame rate FR, the bit rate AUR [i] every AU, the transport time AUT [i] every AU, and the reproduction time DTS [i] every AU according to the information detected by the stream analyzer 104. The arithmetic unit 105 receives maximum bit rate AURmax, a threshold value of Offset, receiving buffer size Bmax, and initial value of ESCR from outside.

The packetizer 102H further comprises a header detecting unit 111 for receiving MPEG4 stream STM1 and detecting headers from the STM1, a header buffer unit 112 for receiving the headers detected by the header detecting unit 111, storing them one by one, and detecting information required to generate the time information to be included in a header of MPEG2-PES packet, a time information generating unit 113H for generating the time information such as ESCR, DTS, and PTS using the information detected by the header buffer unit 112 and the information supplied from the arithmetic unit 105.

The packetizer 102H also comprises a PES header generating unit 114 for generating a PES header using time information such as ESCR, DTS, and PTS generated by the time information generating unit 113H and the information, stream_id, supplied from outside. It also comprises a buffer unit 115 for storing received MPEG4 stream STM1 in sequence on one AU basis and a PES-packetizing unit 116 for generating MPEG2-PES packet with adding the PES header generated by the PES header generating unit 114 into a head of the data of one AU stored in the buffer unit 115.

The transport system 100H shown in FIG. 10 is the same as the system 100G shown in FIG. 9 except that the packetizer 102H includes the stream analyzing unit 104 and the arithmetic unit 105, while the packetizer 100G excludes them. This allows the system 100H to operate like the system 100G. The system 100H obtains the same effect as the system 100G.

2. Packetizing Processes

Figure 11:
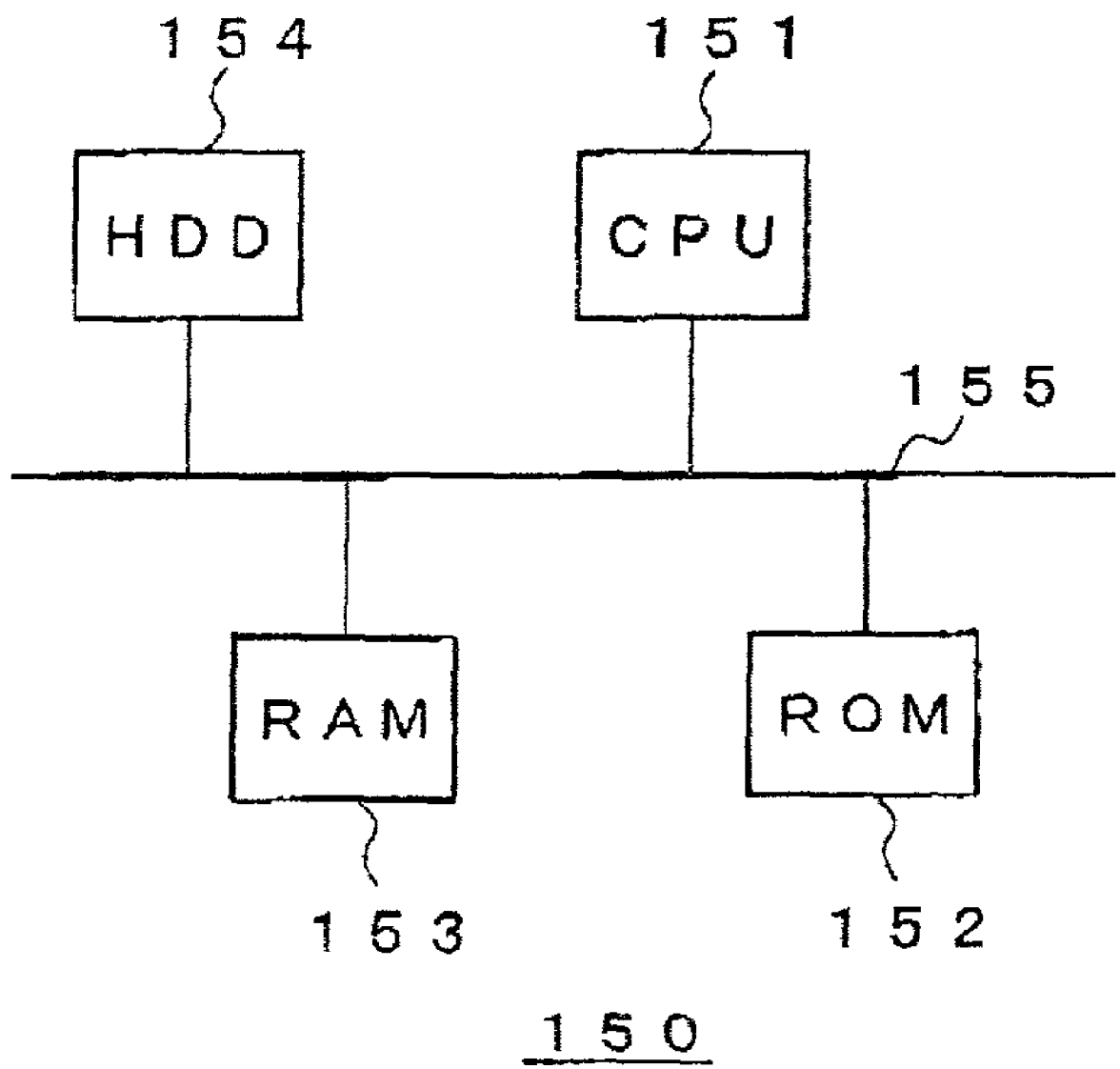
FIG. 11 is a diagram depicting an exemplary configuration of computer for packetizing data stream.

I will illustratively explain packetizing processes, which the packetizer, for example, packetizer 102A of the transport system 100A as shown in FIG. 3 performs, with a computer 150 as shown in FIG. 11 implementing them.

The computer 150 comprises CPU 151, read only memory (hereinafter called ROM) 152 for storing operation program of the CPU 151 etc, random access memory (hereinafter called RAM) 153, and storing medium such as hard disk drive (hereinafter called HDD) 154. All these units, CPU 151, ROM 152, RAM153, and HDD 154 are connected with bus 155. The HDD 154 stores MPEG4 streams STM1 before the translation and streams STM2 of the MPEG2-PES packet form, obtained according to the packetizing processes.

(1) Packetizing Process relating to Packetizer 102A of Transport System 100A embodying the Invention, shown in FIG. 3.

Figure 12:
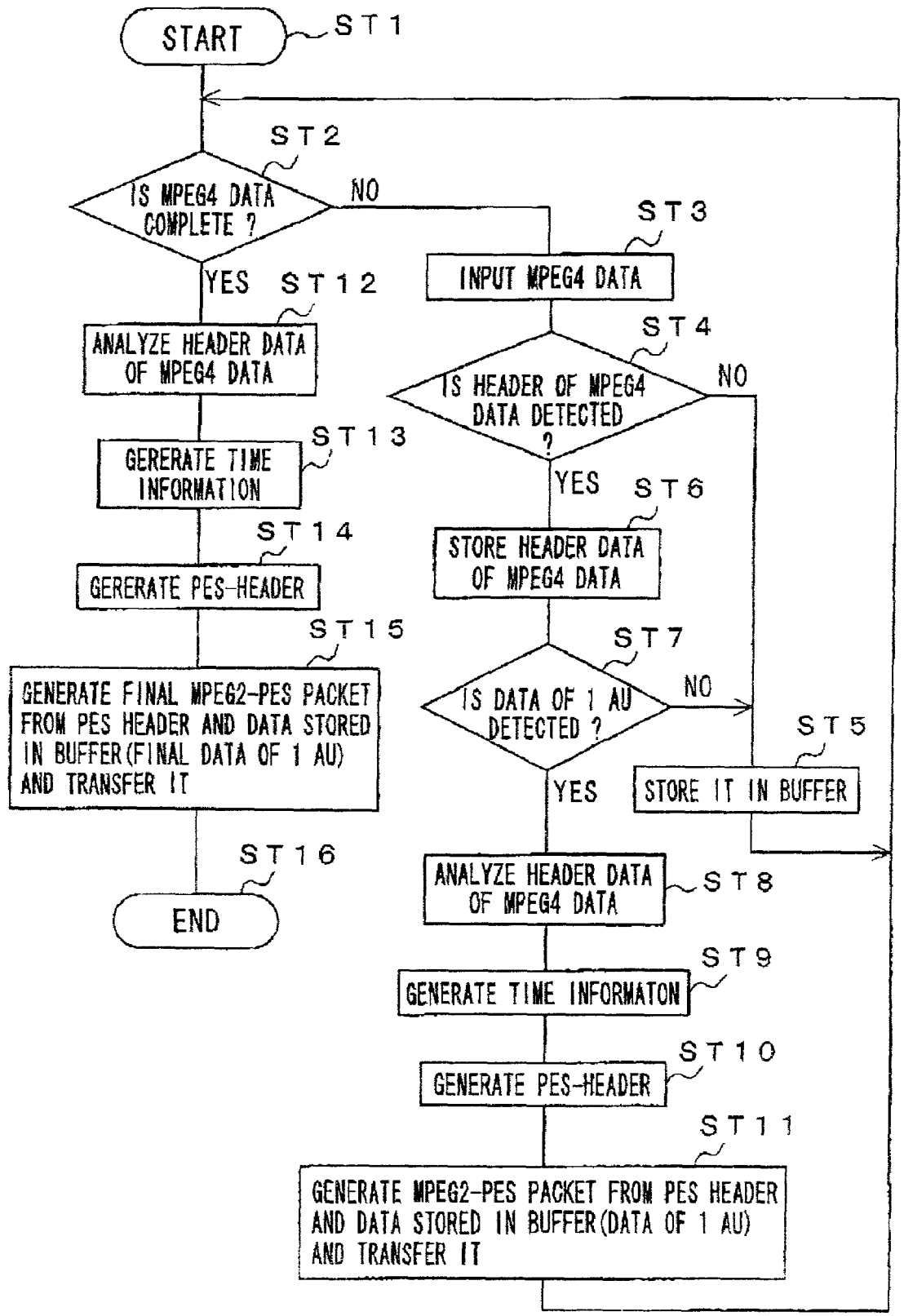
FIG. 12 is a flowchart for an explanation of a flow of packetizing data stream.

Such the packetizing process will be explained referring to a flowchart as shown in FIG. 12.

The process starts at Step 1. The transport system determines whether the MPEG4 data, which the HDD 154 stores as the input data, is complete at Step 2. If not complete, then it reads new MPEG4 data as input data from the HDD 154 at Step 3.

It determines whether the read MPEG4 data includes a header at Step 4. If not included, then the buffer in the RAM 153 stores the data at Step 5 and the process goes to Step 2.

If included, the header buffer in the RAM 153 stores data of this header at Step 6 and it determines whether data of one AU is detected at Step 7. In this case, if a header exceeding next VOP header is detected when it detects the VOP header, then it is set as the data of one AU. Thus, as the data of one AU is detected, the buffer in the RAM 153 stores the MPEG4 data of one AU.

If the data of one AU is not detected at Step 7, then the buffer in the RAM 153 stores the MPEG4 data read at the Step 5 and the process goes to Step 2.

If the data of one AU is detected at Step 7, then it analyzes the data of the header stored in the header buffer in the RAM 153 and detects the information, first_half_vbv_occupancy, latter_half_vbv_occupancy, first_half_bit_rate, latter_half_bit_rate, vop_time_increment_resolution, and fixed_vop_time_increment, from Video_Object_Layer header and the information, vop_coding_type, modulo_time_base, and vop_time_increment, from Video_Object_Plane header, as described in the above description of transport system 100A shown in FIG. 3, at Step 8.

It generates the time information such as ESCR, DTS and PTS, at Step 9, using the information detected at the Step 8 and the initial value of ESCR previously stored in the RAM 153. It then generates the PES header with including the time information therein at Step 10.

It generates MPEG2-PES packet, at Step 11, with adding the PES header generated at the Step 10 into the MPEG4 data of one AU stored in the buffer of the RAM 153 and writes it into the HDD 154 as the output data.

The process goes to the Step 2 and shifts to a new MPEG2-PES packet generating process. Repeating the processes allows the input MPEG4 data to be translated into the MPEG2-PES packet in sequence every AU.

Alternatively, if the MPEG4 data as the input data is already complete at the Step 2, the process shifts to processing of the MPEG4 data of final AU stored in the buffer of the RAM 153. According to the processing, it analyzes the data of header stored in the header buffer of the RAM 153 and detects the same information as the one detected at the Step 8, at Step 12.

It generates the time information such as ESCR, DTS and PTS, at Step 13, using the information detested at the Step 12 and the initial value of ESCR. It then generates the PES header with including the time information therein at Step 14.

It also generates final MPEG2-PES packet, at Step 15, with adding the PES header generated at the Step 14 into the MPEG4 data of final one AU stored in the buffer of the RAM 153 and writes it into the HDD 154 as the output data. The process finishes at Step 16.

(2) Packetizing Process relating to Packetizer 102B of Transport System 100B embodying the Invention, shown in FIG. 4.

Figure 13:
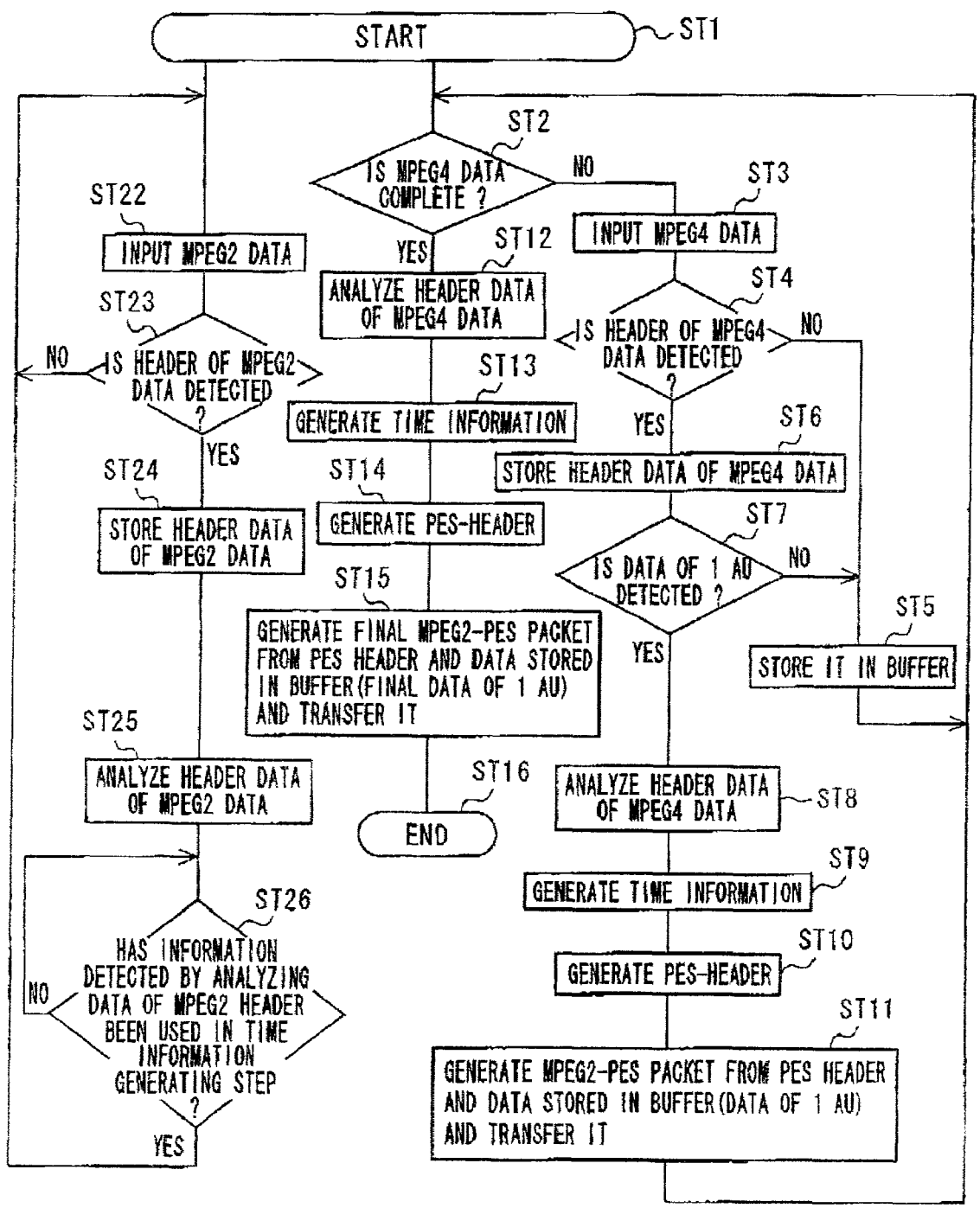
FIG. 13 is a flowchart for an explanation of another flow of packetizing data stream.

Such the packetizing process will be explained referring to a flowchart as shown in FIG. 13. In FIG. 13, like step numbers refer to like step numbers of FIG. 12.

The process starts at Step 1 and it goes to Step 2 or 22. The processes starting from Steps 2 and 22 are carried out in parallel.

Since the process starting from the Step 2, namely, Steps 2 through 16 is the same as the one described in a flowchart as shown in FIG. 12 except for Steps 9 and 13, only these Steps 9 and 13 will be explained.

Although it generates the time information such as ESCR, DTS and PTS, at Steps 9 and 13 in FIG. 12, using the information detected by analyzing the header data in MPEG4 data and the information, ESCR_base, indicating the initial value of ESCR previously stored in the RAM 153, it generates the time information such as ESCR, DTS and PTS, at the Steps 9 and 13 in FIG. 13, using the information on reference time (ESCR'), decoding time (DTS'), reproduction time (PTS'), a number of bytes until ESCR' field (ESCR_byte'), and ES_rate' each detected by analyzing the PES header of MPEG2-PES packet and the information detected by analyzing the header data in MPEG4 data, at Steps 22 or later, as described above in the description of the transport system 100B shown in FIG. 4.

The process starting from Step 22 will be explained. The transport system reads streams of the MPEG2-PES packet form other than the ones generated by translating the MPEG4 data thereinto from the HDD 154 at Step 22. It determines whether the read MPEG2 data includes PES header at Step 23. If not included, then the process goes to the Step 22. The Steps 22 and 23 are repeated until it finds that the read MPEG2 data includes PES header.

If included at the Step 23, then the header buffer of the RAM 153 stores the data of the PES header at Step 24. The data of the PES header stored in the header buffer of the RAM 153 is analyzed and the above information such as ESCR', DTS', PTS', ESCR_byte', and ES_rate', is detected at Step 25.

It then determines whether the information detected at the Step 25 has been used in the time information generating step, Step 9 or 13, at Step 26. If used, the process goes to the Step 22 and shifts to a now process for detecting the information from next PES header included in the MPEG2 data, which the HDD 154 reads out. This allows the process starting from the Step 22 to detect one PES header of the MPEG2 whenever the process starting from the Step 2 detects the MPEG4 stream of one AU.

Thus, the packetizing process according to the flowchart as shown in FIG. 13 allows the input MPEG4 data to be translated into MPEG2-PES packet in sequence on an AU basis like the process according to the flowchart as shown in FIG. 12.

The computer 150 also carries out the packetizing processes relating to packetizers 102C through 102 H of the transport systems 100C through 100H embodying the invention, as shown in FIGS. 3 through 8, depending on their situation and cases. The detailed explanation thereof, however, is omitted.

In the above embodiments, the MPEG4 stream (the MPEG4 data) is translated into the MPEG2-PES packet whereas the invention may also apply to another apparatus and another method of packetizing a coded bitstream of digital data in accordance with its transport protocol.

While the foregoing specification has described preferred embodiments of the present invention, one skilled in the art may make many modifications to the preferred embodiments without departing from the invention in its broader aspects. The appended claims therefore are intended to cover all such modifications as fall within the true scope and spirit of the invention.

What is claimed is:

1. An apparatus for packetizing a coded bitstream of digital data in accordance with a transport protocol comprising:
   time information generating means of generating a time information in accordance with a specification of said transport protocol;
   header generating means of generating a header including said time information generated by said time information generating means; and
   packet generating means of generating a packet with said header generated by said header generating means and added into every predetermined unit of said bitstream,
   wherein order and bytes of every predetermined unit are counted and used in generating the time information.

2. The apparatus as claimed in claim 1,
   wherein said coded bitstream of digital data is MPEG4 stream, and
   wherein said packet generated by said packet generating means is MPEG2-PES packet.

3. The apparatus as claimed in claim 1, further comprising:
   header detecting means of detecting a header from the coded bitstream of digital data; and
   header analyzing means of analyzing said header detected by said header detecting means to obtain predetermined information therefrom,
   wherein said time information generating means generates said time information in accordance with the specification of said transport protocol using said predetermined information obtained by said header analyzing means.

4. The apparatus as claimed in claim 1, further comprising bit rate calculating means of calculating a bit rate of the coded bitstream of digital data,
   wherein said time information generating means generates said time information in accordance with said specification of said transport protocol using said bit rate calculated by said bit rate calculating mean.

5. The apparatus as claimed in claim 1, wherein said time information generating means generates said time information in accordance with the specification of said transport protocol using the time information contained in a predetermined bitstream other than said coded bitstream of digital data.

6. The apparatus as claimed in claim 5,
   wherein said coded bitstream of digital data is MPEG4 stream and
   wherein said packet generated by said packet generating means is MPEG2-PES packet.

7. The apparatus as claimed in claim 1, further comprising an encoder for generating said coded bitstream of digital data,
   wherein said time information generating means generates said time information in accordance with said specification of said transport protocol using information from said encoder.

8. The apparatus as claimed in claim 7, further comprising a decoder for decoding said coded bitstream of digital data,
   wherein said information from said encoder is information concerning said decoder.

9. The apparatus as claimed in claim 7, wherein said information from said encoder is information concerning said coded bitstream of digital data.

10. The apparatus as claimed in claim 1, wherein the time information generating means generates said time information in accordance with said specification of said transport protocol using maximum bit rate of said coded bitstream of digital data.

11. The apparatus as claimed in claim 1, further comprising:
    a stream analyzer of analyzing said coded bitstream of digital data;
    a decoder of decoding at least said coded bitstream of digital data; and
    an arithmetic means of performing arithmetic operation on time until said decoder starts decoding said bitstream on the basis of a result of the analysis of said stream analyzer,
    wherein said time information generating means generates said time information in accordance with said specification of said transport protocol using an arithmetic result of said arithmetic means.

12. An apparatus for packetizing a plurality of coded bitstreams for digital data in accordance with respective transport protocols comprising:
    a plurality of time information generating means each for generating time information in accordance with a specification of each of said transport protocols;
    a plurality of header generating means each for generating a header including a plurality of pieces of time information generated by said plurality of time information generating means; and
    a plurality of packet generating means each for generating a packet with the header generated by said plurality of header generating means and added into every predetermined unit of said plurality of bitstreams,
    wherein said plurality of time information generating means generates time information in accordance with a specification of each of the transport protocols using common time information.

13. The apparatus as claimed in claim 12,
    wherein said coded bitstream of digital data is MPEG4 stream, and wherein said packet generated by said packet generating means is MPEG2-PES packet.

14. A method of packetizing a coded bitstream of digital data in accordance with a transport protocol comprising:
a first step of generating said time information in accordance with a specification of said transport protocol;
a second step of generating a header including said time information generated during the first step; and
a third step of generating a packet with said header generated during the second step and added into every predetermined unit of said bitstream,
wherein order and bytes of every predetermined unit are used in generating the time information.

15. The method as claim 14,
wherein said coded bitstream of digital data is MPEG4 stream, and
wherein said packet generated by said third step is MPEG2-PES packet.

16. The method as claimed in claim 14, further comprising:
a forth step of detecting a header from said coded bitstream of digital data; and
a fifth step of analyzing said header detected during said forth step to obtain predetermined information therefrom,
wherein in said first step, said time information in accordance with the specification of said transport protocol is generated using said predetermined information obtained during said fifth step.

17. The method as claimed in claim 14, further comprising forth step of calculating a bit rate of said coded bitstream of digital data,
wherein in said first step, said time information in accordance with said specification of said transport protocol is generated using said bit rate calculated during said forth step.

18. The method as claimed in claim 14, wherein in said first step, said time information in accordance with said specification of said transport protocol is generated using time information contained in a predetermined bitstream other than said coded bitstream of digital data.

19. The method as claimed in claim 18,
wherein said coded bitstream of digital data is MPEG4 stream, and
wherein said predetermined bitstream is MPEG2-PES packet stream.

20. The method as claimed in claim 14, wherein in said first step, said time information in accordance with said specification of said transport protocol is generated using information from an encoder for generating said coded bitstream of digital data.

21. The method as claimed in claim 20, wherein said information from said encoder is information concerning a decoder for decoding said coded bitstream of digital data.

22. The method as claimed in claim 20, wherein said information from said encoder is information concerning said coded bitstream of digital data.

23. The method as claimed in claim 14, wherein in said first step, said time information in accordance with said specification of said transport protocol is generated using maximum bit rate of said coded bitstream of digital data.

24. The method as claimed in claim 14, further comprising:
a forth step of analyzing said coded bitstream of digital data; and
a fifth step of performing arithmetic operation on time until said decoder for decoding at least said coded bitstream of digital data starts decoding said bitstream on the basis of a result of said forth step,
wherein in said first step, said time information in accordance with said specification of said transport protocol is generated using an arithmetic result of said fifth step.

25. A method of packetizing a plurality of coded bitstreams of digital data in accordance with respective transport protocols comprising:
a first step of generating a plurality of pieces of time information in accordance with a specification of each of said transport protocols;
a second step of generating a plurality of headers including a plurality of pieces of time information generated during said first step; and
a third step of generating a plurality of packets with the headers generated during said second step and added into every predetermined unit of said plurality of bitstreams,
wherein in said first step, said plurality of pieces of said time information in accordance with a specification of each of the transport protocols is generated using common time information.

26. The method as claimed in claim 25, wherein said coded bitstream of digital data is MPEG4 stream, and wherein said packet generated during said third step is MPEG2-PES packet.

27. An apparatus for packetizing a coded bitstream of digital data in accordance with a transport protocol comprising:
storing means of storing every predetermined unit of said coded bitstream;
time information generating means of generating time information for every said predetermined unit, said time information being necessary for a synchronous transport in accordance with said transport protocol; and
packet generating means of generating a packet with said time information generated by said time information generating means and added into every said predetermined unit stored in said storing means,
wherein order and bytes of every predetermined unit are used in generating the time information.

28. An apparatus for packetizing an MPEG4 stream in accordance with a specification of an MPEG2-PES stream protocol comprising:
storing means of storing every predetermined unit of said MPEG4 stream;
time information generating means of generating time information for every said predetermined unit of said MPEG4 stream, said time information being required to transport the bitstream in accordance with an MPEG2-PES stream protocol; and
packet generating means of generating a packet with said time information generated by said time information generating means and added into every said predetermined unit of said MPEG4 stream stored in said storing means,
wherein order and bytes of every predetermined unit are used in generating the time information.

29. The apparatus as claimed in claim 27, wherein said time information generating means generates said time information using time information embedded in a separate packet stream from said packet stream synchronously transported in accordance with said transport protocol.

30. The apparatus as claimed in claim 28, wherein said time information generating means generates said time information using time information embedded in a separate MPEG2-PES stream.

31. An apparatus for packetizing an MPEG4 stream in accordance with a specification of an MPEG2-PES stream protocol comprising:

storing means of storing every predetermined unit of said MPEG4 stream;

detecting means of detecting information from said MPEG4 stream, said information being required to generate said time information required when said MPEG2-PES stream is transported;

time information generating means of generating said time information for every said predetermined unit of said MPEG4 stream on the basis of said information detected by said detecting means; and packet generating means of generating a packet with said time information generated by said time information generating means and added into every said predetermined unit of said MPEG4 stream stored in said storing means, wherein order and bytes of every predetermined unit are used in generating the time information.

32. The apparatus as claimed in claim 31, wherein said detecting means detects a bit rate of said MPEG4 stream, occupancy of the data to be stored in a buffer until a start of decoding said MPEG2-PES stream, and frame rate on said MPEG4 stream, from said MPEG4 stream.

33. The apparatus as claimed in claim 32, wherein said detecting means further detects information indicating one of I-picture, P-picture and B-picture, information indicating how many seconds it takes from said I-picture, and information indicating an order of reproduction, from said MPEG4 stream.

34. An apparatus for packetizing a coded bitstream of digital data in accordance with a transport protocol comprising:

header detecting means of detecting a header from the coded bitstream of digital data;

header analyzing means of analyzing said header detected by said header detecting means to obtain predetermined information therefrom;

time information generating means of generating a time information in accordance with a specification of said transport protocol using said predetermined information obtained by said header analyzing means;

header generating means of generating a header including said time information generated by said time information generating means; and packet generating means of generating a packet with said header generated by said header generating means and added into every predetermined unit of said bitstream.

35. A method of packetizing a coded bitstream of digital data in accordance with a transport protocol comprising:

a step of detecting a header from the coded bitstream of digital data;

a step of analyzing said detected header to obtain predetermined information therefrom;

a step of generating a time information in accordance with a specification of said transport protocol using said predetermined information;

a step of generating a header including said time information; and a step of generating a packet with said header added into every predetermined unit of said bitstream.

36. An apparatus for packetizing a coded bitstream of digital data in accordance with a transport protocol comprising:

a stream analyzer of analyzing said coded bitstream of digital data;

a decoder of decoding at least said coded bitstream of digital data;

an arithmetic means of performing arithmetic operation on time until said decoder starts decoding said bitstream on the basis of a result of the analysis of said stream analyzer;

time information generating means of generating a time information in accordance with a specification of said transport protocol using an arithmetic result of said arithmetic means;

header generating means of generating a header including said time information generated by said time information generating means; and packet generating means of generating a packet with said header generated by said header generating means and added into every predetermined unit of said bitstream.

37. A method of packetizing a coded bitstream of digital data in accordance with a transport protocol comprising:

a step of analyzing said coded bitstream of digital data;

a step of decoding at least said coded bitstream of digital data;

a step of performing arithmetic operation on time until said decoder starts decoding said bitstream on the basis of a result of the analysis;

a step of generating a time information in accordance with a specification of said transport protocol using an arithmetic result;

a step of generating a header including said time information; and a step of generating a packet with said header added into every predetermined unit of said bitstream.

* * * * *